United States Patent
Cates

(10) Patent No.: US 8,566,796 B2
(45) Date of Patent: Oct. 22, 2013

(54) SYSTEMS AND METHODS FOR INTERACTIONS WITH SOFTWARE PROBES

(75) Inventor: Claire S. Cates, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 1536 days.

(21) Appl. No.: 12/062,777

(22) Filed: Apr. 4, 2008

(65) Prior Publication Data

US 2009/0254821 A1    Oct. 8, 2009

(51) Int. Cl.
*G06F 9/44* (2006.01)

(52) U.S. Cl.
USPC ............ 717/128; 717/124; 717/125; 717/126; 717/127

(58) Field of Classification Search
USPC .............................. 717/101–178; 714/1–824; 715/200–867; 324/300–727
See application file for complete search history.

(56) References Cited

U.S. PATENT DOCUMENTS

| | | | |
|---|---|---|---|
| 5,724,590 A | 3/1998 | Goettelmann et al. | |
| 5,732,272 A | 3/1998 | Gochee | |
| 5,828,883 A | 10/1998 | Hall | |
| 5,963,739 A | 10/1999 | Homeier | |
| 6,096,089 A | 8/2000 | Kageshima | |
| 6,539,539 B1 * | 3/2003 | Larsen et al. | 717/124 |
| 6,560,773 B1 | 5/2003 | Alexander, III et al. | |
| 6,598,105 B1 | 7/2003 | Oshins et al. | |
| 6,671,876 B1 * | 12/2003 | Podowski | 717/130 |
| 6,678,883 B1 | 1/2004 | Berry et al. | |
| 6,718,485 B1 | 4/2004 | Reiser | |
| 6,782,462 B2 | 8/2004 | Marion et al. | |
| 6,912,675 B2 | 6/2005 | Swoboda | |
| 6,934,935 B1 | 8/2005 | Bennett et al. | |
| 6,978,401 B2 | 12/2005 | Avvari et al. | |
| 7,013,456 B1 * | 3/2006 | Van Dyke et al. | 717/130 |
| 7,043,237 B2 * | 5/2006 | Snyder et al. | 455/425 |
| 7,079,688 B1 | 7/2006 | Deco et al. | |
| 7,093,234 B2 * | 8/2006 | Hibbeler et al. | 717/124 |
| 7,093,241 B2 | 8/2006 | Huang et al. | |
| 7,143,392 B2 | 11/2006 | Li et al. | |
| 7,165,190 B1 | 1/2007 | Srivastava et al. | |
| 7,167,821 B2 | 1/2007 | Hardwick et al. | |
| 7,178,066 B2 * | 2/2007 | Ravichandran | 714/42 |
| 7,184,944 B1 | 2/2007 | Rieschl et al. | |
| 7,257,692 B2 | 8/2007 | Schumacher | |
| 7,292,969 B1 | 11/2007 | Aharoni et al. | |
| 7,392,508 B1 * | 6/2008 | Podowski | 717/125 |
| 7,409,679 B2 | 8/2008 | Chedgey et al. | |
| 7,506,319 B2 | 3/2009 | Purcell et al. | |

(Continued)

OTHER PUBLICATIONS

A Real-Time Microprocessor Debugging Technique; Charles R. Hill; Computer Systems Research, Philips Laboratories, Briarcliff Manor, N.Y.; 1983 Article.*

(Continued)

*Primary Examiner* — Lewis A Bullock, Jr.
*Assistant Examiner* — Francisco Aponte
(74) *Attorney, Agent, or Firm* — Kilpatrick Townsend & Stockton LLP

(57) ABSTRACT

Systems and methods are provided for enabling interaction between a user and a software probe inserted into application code for monitoring and testing application performance. Communications are initialized with the software probe and a user interface is provided to the user. Command data is received from the user through the interface and forwarded to the software probe. In response, data communications are received from the software probe.

36 Claims, 23 Drawing Sheets

(56) References Cited

U.S. PATENT DOCUMENTS

| | | | |
|---|---|---|---|
| 7,509,632 B2 | 3/2009 | Boger | |
| 7,512,765 B2 | 3/2009 | Kurtz | |
| 7,590,894 B2 | 9/2009 | Swoboda et al. | |
| 7,992,098 B2* | 8/2011 | Kaushikkar et al. | 715/803 |
| 2002/0095660 A1* | 7/2002 | O'Brien et al. | 717/127 |
| 2003/0056199 A1 | 3/2003 | Li et al. | |
| 2004/0003375 A1* | 1/2004 | George et al. | 717/124 |
| 2004/0075690 A1* | 4/2004 | Cirne | 345/771 |
| 2004/0267691 A1* | 12/2004 | Vasudeva | 707/1 |
| 2005/0114843 A1 | 5/2005 | Gilgen et al. | |
| 2005/0166094 A1 | 7/2005 | Blackwell et al. | |
| 2005/0183074 A1 | 8/2005 | Alexander et al. | |
| 2005/0183075 A1 | 8/2005 | Alexander et al. | |
| 2005/0235127 A1 | 10/2005 | Muthiah et al. | |
| 2006/0085156 A1 | 4/2006 | Kolawa et al. | |
| 2006/0214679 A1* | 9/2006 | Henson et al. | 324/765 |
| 2007/0011428 A1 | 1/2007 | Kurtz | |
| 2007/0169051 A1 | 7/2007 | Krauss | |
| 2008/0120268 A1* | 5/2008 | Ruiz et al. | 707/1 |
| 2008/0177526 A1 | 7/2008 | Kano et al. | |
| 2009/0132225 A1* | 5/2009 | Safabakhsh et al. | 703/22 |
| 2009/0210750 A1 | 8/2009 | Cates | |
| 2010/0106933 A1 | 4/2010 | Kamila et al. | |
| 2010/0218149 A1 | 8/2010 | Sasaki | |
| 2010/0241908 A1 | 9/2010 | Cates | |
| 2010/0281303 A1 | 11/2010 | Cates | |

OTHER PUBLICATIONS

Ayers, Andrew et al., "TraceBack: First Fault Diagnosis by Reconstruction of Distributed Control Flow", PLDI '05, pp. 201-212 (Jun. 12-15, 2005).

Begic, Goran, "An introduction to runtime analysis with Rational PurifyPlus", Nov. 19, 2003, 11 pp.

Chilimbi, Trishul M. et al., "Low-Overhead Memory Leak Detection Using Adaptive Statistical Profiling", ASPLOS '04, Oct. 9-13, 2004, pp. 156-164.

Jump, Maria et al., "Cork: Dynamic Memory Leak Detection for Java", Technical Report TR-06-07, Jan. 2006, 10 pp.

Spivey, J.M., "Fast, accurate call graph profiling", Software Practice and Experience, vol. 34, Issue 3, pp. 249-264 [2004].

Xie, Tao et al., "An Empirical Study of Java Dynamic Call Graph Extractors", University of Washington Technical Report, pp. 1-11 [Feb. 12, 2003].

Bemat, Andrew R. et al., "Incremental Call-Path Profiling," Concurrency and Computation: Practice and Experience, vol. 19, Issue 11, pp. 1533-1547 (2007).

Lee, Soojung, "Fast, Centralized Detection and Resolution of Distributed Deadlocks in the Generalized Model," IEEE Transactions on Software Engineering, vol. 30, No. 9, pp. 561-573 (Sep. 2004).

Wu, Jingwei et al., "A Multi-Perspective Software Visualization Environment," IBM Press, pp. 1-10 (2000).

Pevzner, P.A. et al., "Multiple Filtration and Approximate Pattern Matching", Algorithmica, 13, pp. 135-154 (1995).

Williams, Amy Lynne, "Static Detection of Deadlock for Java Libraries", Massachusetts Institute of Technology, 67 pp. (2005).

Cates, Claire "How's Your Memory" CMG Conference, (Jun. 2009) 10 pp.

Ammons, Glen et al., "Finding and Removing Performance Bottlenecks in Large Systems", (2004) 26 pp.

OC Systems Aprobe Technology, downloaded from http://www.ocsystems.com/tech_aprobe.html Apr. 4, 2008, 2 pp.

OC Systems SAS RootCause Client Profile, downloaded from http://www.ocsystems.com/casestudy_sas.html Apr. 4, 2008, 2 pp.

Hitchhiker Lifecycle Application Diagnostics for C/C++, downloaded from http://www.ocsystems.com/eclipse/index.html Apr. 4, 2008, 2 pp.

Cole, Oliver, "Aprobe: A Non-intrusive Framework for Software Instrumentation", OC Systems, Inc., (2004) pp. 1-10.

* cited by examiner

```
Select Cmd.exe

C:\memory>
C:\memory>
C:\memory>ria

C:\memory>rc_pools

C:\memory>echo off
Registry updated.
Adding Program: "C:\SASv9\sasgen\dev\mva-v920\sas_dvd\com\dntno\sas.exe" <c:\SAS
v9\sasgen\dev\mva-v920\sas_dvd\com\dntno\sas.exe> ->c:\probes\pools.aws"
Registry updated.
RootCause registry found and RootCause is ENABLED
for registered applications.
----------
Pools probe active
C:\memory>_
```

```
Select Cmd.exe-sdssas

For registered applications.
-----------
Pools probe active
C:\memory>sdssas
DNT/SDSSAS Version 4.0-07-1128.1120
NOTE <sdssas>: STARTED ... 2008/01/16.13:18:35
NOTE <sdssas>: ISERVER ... anvil;yosemite
NOTE <sdssas>: IMGTO ... 10
NOTE <sdssas>: WARNING ... Using tag-m901 for GISMAPS!
NOTE <sdssas>: PLAYPEN ... -path           C:\memory\com\dntno
NOTE <sdssas>: PLAYPEN ... -resourcesloc   C:\memory\com\dntno
Invoking SAS, dev/mva-v920.dntno.DVD [dev/mva-v920/dntno/sas_dvd sas.exe] ...
C:\SASv9\sasgen\dev\mva-v920\sas_dvd\com\dntno\sas.exe -config C:\SASv9\tmp\SASv
9-4400.cfg -sashost C:\SASv9\sasgen\dev\mva-v920\sas_dvd\com\dntno\sashost.dll
NOTE: Copyright (c) 2002-2008 by SAS Institute Inc., Cary, NC, USA
NOTE: SAS (r) Proprietary Software 9.2 (TS2B0)
      Licensed to SAS Institute Inc., Site 0000000001.
This session is executing on the XP_PRO platform.

NOTE: SAS initialization used:
      real time       3.21 seconds
      cpu time        5.40 seconds

1?_
```

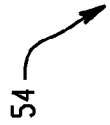

Fig. 5

```
☐ c:\RCTemp\Current_1.txt
File  Edit  Help
```

Current View of Lake Data

| Ocean# | Name | Total Si... |
|---|---|---|
| 0 | TKHOST | 1835008 |
| 1 | FIXEDHOST | 262144 |
| 2 | KERNELDEBUG | 0 |
| 3 | TRANS | 262144 |
| 4 | LARGEHOST | 0 |
| 5 | LOW | 262144 |
| 6 | MALLOC | 0 |
| 7 | OS | 250223 |
| 8 | IMAGES | 15038976 |
| 9 | VIRTUAL | 12582912 |
| 10 | STACKS | 11534336 |

Pool Data

| Type | Pool Name | Thread | PID | Ocean | User Serialized |
|---|---|---|---|---|---|
| T_REB | LineMod | Line-Mod_15 | 136 | 0 | User-Single |
| TKM | Diagnosticcontextpool | Line-Mod_15 | 133 | 3 | User-Single |
| T_REB | LineMod | sasxkern_11 | 132 | 3 | User-Multiple |
| TKM | SAS appenderpool | sasxkern_11 | 131 | 3 | TKM-Single |
| TKM | Diagnosticcontextpool | sasxkern_11 | 130 | 3 | User-Single |
| TKM | Diagnosticcontextpool | TKSRV_13 | 129 | 3 | User-Single |
| TKM | tkiongPool | TKSRV_13 | 128 | 0 | TKM-Multiple |
| TKM | NONAME | sasxkern_11 | 127 | 3 | User-Single |
| T_TASK | MAIN | sasxkern_11 | 123 | 5 | User-Single |
| T_REB | Kernel | sasxkern_11 | 122 | 0 | User-Single |
| T_REB | Kernel | sasxkern_11 | 121 | 0 | User-Multiple |
| T_TASK | MAIN | sasxkern_11 | 117 | 5 | User-Single |
| T_REB | LineMod | sasxkern_11 | 116 | 0 | User-Single |
| T_REB | Kernel | sasxkern_11 | 115 | 0 | User-Single |
| T_TASK | MAIN | sasxkern_11 | 114 | 5 | User-Single |
| T_REB | LineMod | sasxkern_11 | 113 | 0 | User-Multiple |
| T_REB | Kernel | sasxkern_11 | 112 | 0 | User-Multiple |
| T_REF | LineMod | sasxkern_11 | 111 | 1 | User-Single |
| T_REF | LineMod | sasxkern_11 | 110 | 1 | User-Single |
| T_REB | LineMod | sasxkern_11 | 109 | 3 | User-Multiple |
| T_REF | LineMod | sasxkern_11 | 108 | 1 | User-Single |
| T_REB | LineMod | sasxkern_11 | 107 | 0 | User-Multiple |
| T_TASK | TKSRV | sasxkern_11 | 106 | 0 | User-Single |
| T_REB | TKSRV | sasxkern_11 | 105 | 0 | User-Single |
| T_TASK | Session | sasxkern_11 | 104 | 0 | User-Single |
| T_REB | Session | sasxkern_11 | 103 | 0 | User-Single |
| T_REF | Kernel | sasxkern_11 | 99 | 1 | User-Multiple |
| T_REF | Kernel | sasxkern_11 | 97 | 1 | User-Single |
| TKM | tkstringpool | sasxkern_11 | 96 | 3 | TKM-Single |
| TKM | TKEUTILPersistentPool | sasxkern_11 | 95 | 0 | TKM-Single |
| TKM | TKEUTILPersistentResource Track-rt-pool | sasxkern_11 | 94 | 0 | TKM-Single |
| TKM | TKEUTILExtensionPool | sasxkern_11 | 93 | 0 | TKM-Single |
| T_REF | Kernel | sasxkern_11 | 92 | 1 | User-Single |
| T_REF | Kernel | sasxkern_11 | 91 | 1 | User-Single |
| T_REF | Kernel | sasxkern_11 | 90 | 1 | User-Multiple |
| T_REF | Kernel | sasxkern_11 | 89 | 1 | User-Multiple |

Ready

MATCH TO FIG. 8B

*Fig. 8A*

Fig. 18

```
Select Cmd.exe-sdssas
Probe Debug File is rc.txt
Probe Debugging has been Turned ON C:\memory>sdssas
DNT/SDSSAS Version 4.0-07-1128.1120
NOTE <sdssas>: STARTED ... 2008/01/16.13:42:14
NOTE <sdssas>: ISERVER ... anvil;yosemite
NOTE <sdssas>: IMGTO ... 10
NOTE <sdssas>: WARNING ... Using tag-m901 for GISMAPS!
NOTE <sdssas>: PLAYPEN ... -path         C:\memory\com\dntno
NOTE <sdssas>: PLAYPEN ... -resourcesloc  C:\memory\com\dntno
Invoking SAS, dev/mva-v920.dntno.DVD [dev/mva-v920/dntno/sas_dvd sas.exe] ...
C:\SASv9\sasgen\dev\mva-v920\sas_dvd\com\dntno\sas.exe -config C:\SASv9\tmp\SASv
9-5700.cfg -sashost C:\SASv9\sasgen\dev\mva-v920\sas_dvd\com\dntno\sashost.dll
NOTE: Copyright (c) 2002-2008 by SAS Institute Inc., Cary, NC, USA
NOTE: SAS (r) Proprietary Software 9.2 (TS2B0)
      Licensed to SAS Institute Inc., Site 0000000001.
This session is executing on the XP_PRO platform.

NOTE: SAS initialization used:
      real time           2.78 seconds
      cpu time            5.37 seconds

1?
```

US 8,566,796 B2

SYSTEMS AND METHODS FOR INTERACTIONS WITH SOFTWARE PROBES

FIELD

The technology described in this patent document relates generally to software data probes and more specifically to real-time interaction with instrumented software data probes.

BACKGROUND

Software debugging and testing are difficult and time-consuming tasks. While these tasks are vital to the success of an application programming project, they can add significant time and cost to the project. In order to mitigate these time and money costs, a variety of testing tools are available to the application testing engineer to enable him to function more efficiently. One such testing tool is a software probe. A software probe, such as OC System's AProbe™, allows a user to temporarily add code to a software product without modifying the product's code base allowing the capture of performance metrics as an aid in identifying off-nominal application function. Enclosed herein are systems and methods for improving the usability of instrumented software probes including a user interface facilitating real time interaction with an executing software probe, a code injection mechanism allowing a user to inject and execute code segments into an executing software probe, and a visualization aid improving the readability of commonly captured metrics. These improvements advance the goal of more efficient software debugging and testing by improving testing engineer cost and time efficiency.

BRIEF DESCRIPTION OF THE DRAWINGS

FIG. 4 depicts the activation of a probe communication application and the identification of a software data probe to be inserted into a program file.

FIG. 5 depicts the activation of an executable file marked to have software data probe code inserted.

FIG. 18 depicts the initialization of the sas.exe executable file via the execution of the 'sdssas' batch file.

DETAILED DESCRIPTION

Figure 1:
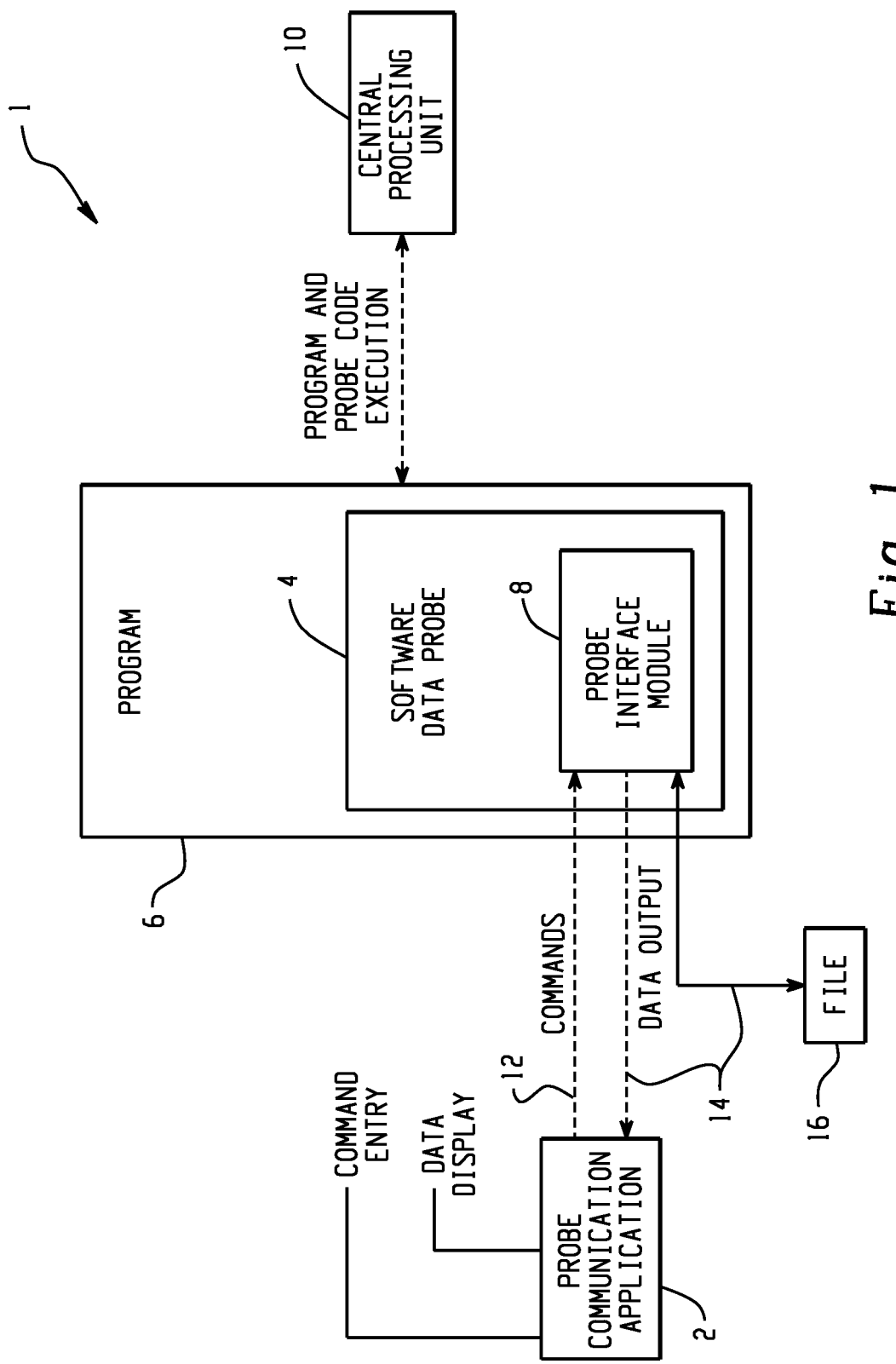
FIG. 1 is a block diagram depicting a software data probe communication system.

FIG. 1 is a block diagram depicting a software data probe communication system 1. The data probe communication system 1 includes a probe communication application 2 and a software data probe 4 contained within the code of a computer program 6. The computer program 6 resides in the main memory (not shown) of a computer such that the program 6, along with the software data probe 4 contained within the program 6, may be executed on a central processing unit (CPU) 10. The probe communication application 2 communicates with the software data probe 4 via a probe interface module 8 contained within the software probe 4. The probe interface module 8 is a portion of code inserted within a software data probe 4 to enhance user communication functionality. The communication between the probe communication application 2 and the probe interface module 8 is bidirectional in nature such that commands 12 may be communicated from the probe communication application 2 to the probe interface module 8 for execution by the software data probe 4, and metric output data 14 may be communicated from the software data probe 4 through the probe interface module 8 to the probe communication application 2. In addition to communicating metric output data 14 to the probe communication application 2, the probe interface module 8 may also communicate metric output data 14 to a file 16 contained on a hard disk (not shown) for storage.

Figure 2:
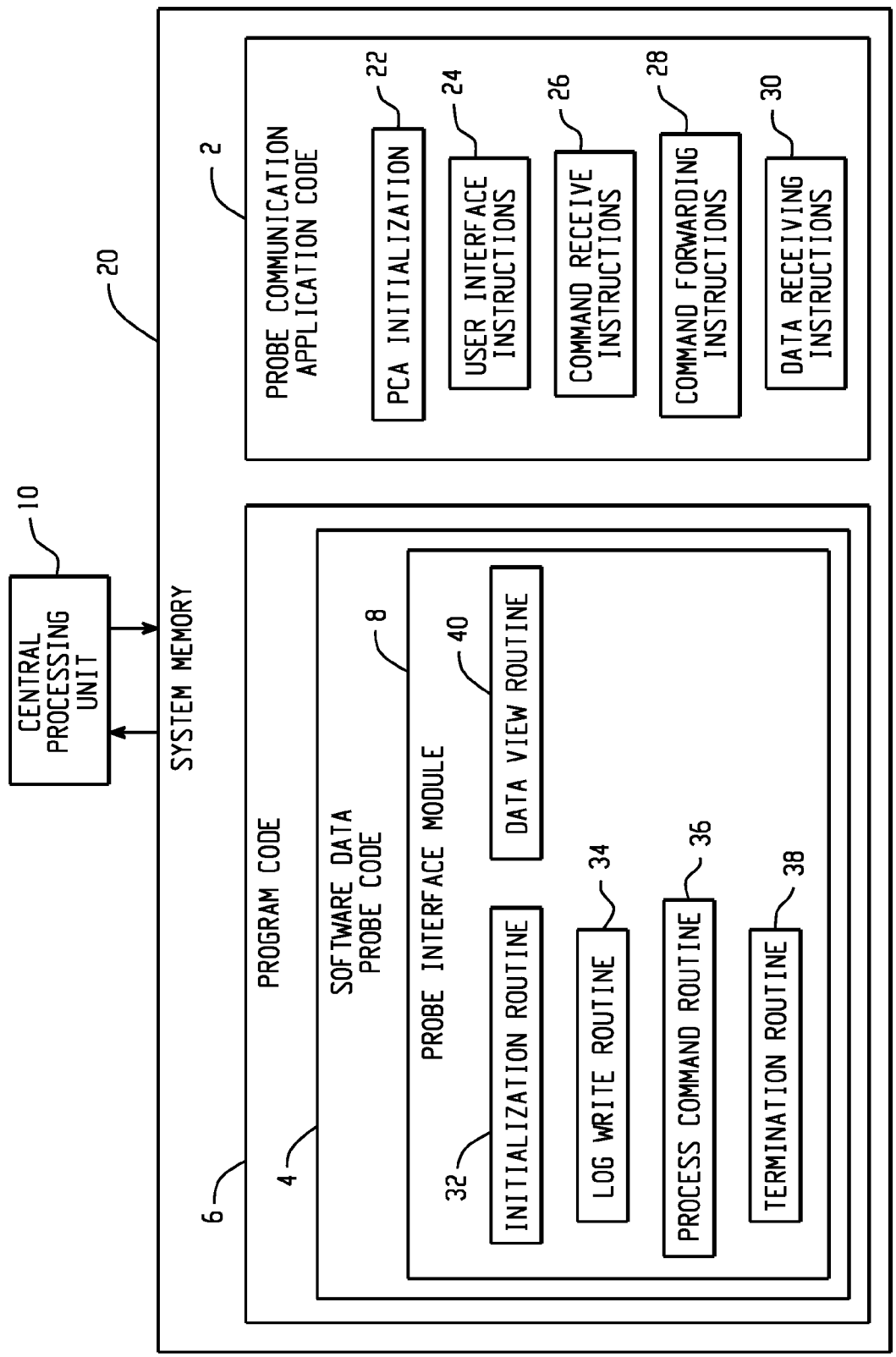
FIG. 2 is a block diagram depicting the organization of a software data probe and a probe communication application in system memory.

FIG. 2 is a block diagram depicting the organization of a software data probe 4 and a probe communication application 2 in system memory. The system memory 20 is responsive to the CPU 10 such that the code of active programs such as the probe communication application 2 and other programs 6 may be executed by the CPU 10. In FIG. 2, the system memory 20 holds the code of two active applications, a general program 6 and a probe communication application 2.

The first application is a probe communication application 2 for offering a user interface to an instrumented software data probe 4. The probe communication application 2 stored within the system memory 20 contains a plurality of functionalities for enabling bidirectional communications between the user interface and the software data probes 4. These functionalities include a probe communication application initialization routine 22, a set of user interface instructions 24, functionality for receiving a command from a user 26, a routine for forwarding received commands to the software data probes 28, and instructions for receiving data from the software data probe 30 via the probe interface module 8.

The probe communication application initialization routine 22, performs the initial communications setup for the probe communication application 2 such that the probe communication application 2 can listen for activated software data probes 4 and then freely communicate bidirectionally with these probes 4. The probe communication application initialization routine 22 creates a socket for a software data probe 4 to connect with the probe communication application 4 via the probe interface module 8 using a specified "output" port. Upon receipt of a probe activation signal from a software data probe's 4 probe interface module 8, the probe communication application initialization routine 22 may also negotiate a "command" port with the probe interface module 8 such that commands may be sent from the probe communication application 2 to the probe interface module 8 via the command port and output may be received by the probe communication application 2 from the software data probe 4 through the probe interface module 8 via the negotiated output port.

Figure 3:
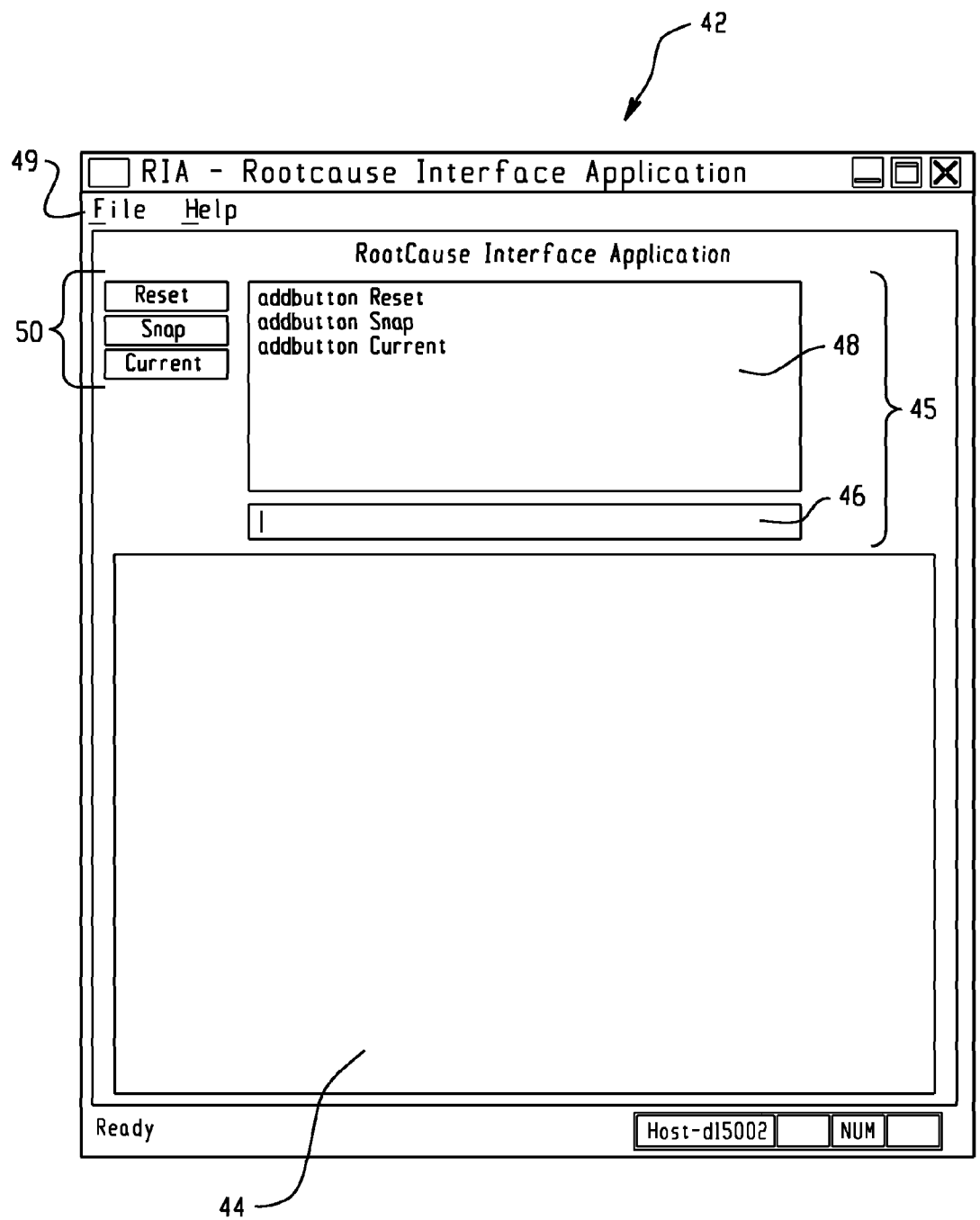
FIG. 3 depicts an example user interface.

The user interface instructions 24 control the creation and maintenance of the user interface. The user interface enables an easy means of communication between a user and an instrumented software data probe 4. FIG. 3 depicts an example user interface. The user interface instructions 24 create a log area 44 and a command entry area 45. The log area 44 is a text box for the display of command data 12 sent to the software data probe 4 as well as output metric data 14 from the software data probe 4 and other status data which may be of interest to the user. The command entry area 45 enables the user to enter a variety of commands 12 to be sent to the software data probe 4. These commands 12 may be entered via a text entry box 46. Commands 12 could also be selected by the user via a series of command buttons 50.

Command buttons 50 may be added or removed by the user in order to secure easy access to often used commands. This process is illustrated in FIG. 3 by the command history box 48 which contains a running lists of commands sent to the software data probe 4 from the probe communication application 2. In the example of FIG. 3, the 'Reset,' 'Snap,' and 'Current' command buttons 50 were created by typing the 'addbutton Reset,' 'addbutton Snap,' and 'addbutton Current' commands into the text entry box 46. The entry of the 'addbutton' command into the text entry box 46 instructs the user interface instructions 24 to create a command button 50 on the user interface 42 that will send the indicated command to the software data probe 4 upon selection with a selection device such as a mouse or keyboard. Recently used commands may also be resent to the software data probe 4 by double-clicking the command or selecting the command via a keyboard in the command history box 48. The user interface setup may be saved by the user. Upon receipt of a 'save' instruction, the current user interface setup is stored in a configuration file which may be loaded by a user request to restore the saved user interface setup. The 'save' command, which is not shown, may be located under the 'File' dropdown menu 49 in a Windows™ or similar operating system.

With reference back to FIG. 2, the probe communication application also contains instructions for receiving instructions from the user 26. The command receive instructions 26 interpret user commands in the user interface 42, shown in FIG. 3. As noted with reference to FIG. 3, these commands may be entered via typing in the text entry box 46, selecting a command button 50, or double clicking or selecting via a keyboard a recently used command in the command history box 48. The command receive instructions 26 interpret the user actions in order that the probe communication application may respond appropriately.

The probe communication application 2 stored in the user memory 20 in FIG. 2 also contains instruction for forwarding commands to the software data probe 28. After the probe communication application initialization module 22 has initialized communications between the software data probe 4 and the probe communication application 2, the command forwarding instructions take commands received by the command receive instructions 26 and forward them to the software data probe 4 via the command port negotiated by the probe communication application initialization routine 22.

The probe communication application 2 also contains instructions 30 for receiving and displaying data 30. The data receiving instructions 30 may listen on the output port negotiated by the probe communication application initialization routine 22. The data receiving instructions 30 receive output metric data 14 via the output port and may display the output metric data 14 in the log area 44 displayed in FIG. 3. Output metric data 14 may also be logged to a file according to the settings of the software data probe 4 and the probe communication application 2. The logging of output metric data 14 to a file may be done through the probe communication application 2 or directly from the software data probe 4 itself.

The second application residing in the system memory 20 is a general program 6 which contains a software data probe 4 for enabling the capturing of output metric data 14. As noted above, a software data probe 4 is a portion of code inserted into the code of a computer program 6 which enables capturing of output metric data 14 of the running program 6. Output metric data 14 may be any data indicative of the functioning of the general program 6 such as variable values, system memory 20 status, CPU resources utilized, as well as many others. The software data probe 4 contains a probe interface module 8 for enabling interaction with a probe communication application 2. The probe interface module 8 is a portion of code which is inserted within a software data probe 4 which enhances the user communication functionality of the software data probe 4 by allowing a user to communicate bidirectionally with a running software data probe 4. The probe interface module contains a number of functionalities for facilitating communications between the software data probe 4 and the probe communication application 2. These functionalities include an initialization routine 32, a log write routine 34, a process command routine 36, a termination routine 38, and a data view routine 40.

The probe initialization routine 22 negotiates the initial communications between the probe interface module 8 and the probe communication application 2. The probe interface module initialization routine 32 enables the setup of the real-time bidirectional communications ability automatically. This avoids the difficulty of manually allocating and connecting ports and sockets for communications and offers an increase in testing engineer efficiency. As noted with reference to the probe configuration application initialization routine 22, upon initialization of the probe communication application 2, the initialization routine 22 creates a socket for a software data probe 4 to connect to using a specified port. This specified port is the output port that the probe communication application 2 listens to for software data probe 4 communications.

Upon initialization of a program 6 which contains a software data probe 4 utilizing the probe interface module 8, the probe interface module's 8 probe initialization routine 32 attempts to connect to the probe communication application 2 via the specified output port. The probe initialization routine 32 may check an internal HOST variable to see if a host is specified. If no specific host is specified, the probe initialization routine 32 attempts to connect to the probe communication application 2 on the local host through a default output port such as 0x8015. If the probe initialization routine 32 detects that the probe communication application 2 is listening on the output port, then the probe initialization routine 32 connects to the port. The probe initialization routine 32 then creates a second socket enabling the probe communication application 2 to communicate with the probe interface module 8 via the specified command port. The probe initialization routine 32 then sends a signal to the probe communication application 2 via the output port informing the probe communication application 2 that the software data probe 4 is ready to receive commands. The software data probe 4 may then enter a wait state until a command is received or may begin functioning according to a set of default instructions.

The probe interface module's 8 log write routine 34 contains instructions for outputting output metric data 14 and other status data. The log write routine 34 may forward pertinent data to the probe communication application 2 to be written to the log area 44 depicted in FIG. 3 via the data receiving instructions 30 of the probe communication application 2. The log write routine 34 may also output data to a data file 16 depicted in FIG. 1 such that the data may saved for access and analysis at a later time.

The process command routine 36 enables the probe communication application 2 to execute commands in an instrumented software data probe according to user instructions. Following selection of a command to be executed by a user utilizing the probe communication application's user interface 42 shown in FIG. 3, the command is forwarded to the probe interface module 8 and is processed by the process command routine 36. The process command routine 36 then initializes the performance of the requested command. The requested command may be part of the program code 6, the generic software data probe 4 functionality or may be part of the added functionality incorporated into the software data probe 4 via the probe interface module 8. Sample commands may include taking a snapshot of current memory allocations and writing them to a data file, printing certain variable values to the log area 44 of the probe communication application 2, resetting the program 6 being tested, as well as many others.

The termination routine 38 discontinues the communications between the software data probe 4 and the probe communication application 2 through the probe interface module 8. The termination module 40 releases the command and output sockets and ports such that they may be utilized by the probe communication application 2 with other software data probe instances. The termination of communications with a data probe may be requested by a user as a command or may be the result of a normal shutdown of the program being analyzed 6. The cleanup of the termination routine 40 helps to mitigate memory leakages as well as freeing computer resources.

Figure 8B:
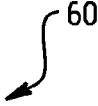
FIG. 8 depicts a data view displaying a captured memory state during the execution of a program being tested.

When activated, the data view routine 40 initializes a user view which depicts a data set captured by the software data probe 4. The data view routine 40 may be called by a user through the process command routine 36, as instructed by another user called command, or by other instructions from the probe interface module 8. One example of a data view initialized by the data view routine 40 is shown in FIG. 8. The data view 60 of FIG. 8 depicts tables containing information regarding the memory state of a computer system at a time of data capture.

FIGS. 4-10 depict an example session of a probe communication application 2 interacting with a software data probe 4. FIG. 4 depicts the activation of a probe communication application 2 and the identification of a software data probe 4 to be inserted into a program file. The first command executed in the example beginning with FIG. 4 is the 'ria' command. The 'ria' command initializes the executable for the probe communication application 2, ria.exe. Executing the ria.exe file initializes a probe communication application window 42 like the window displayed in FIG. 3. In this example, the probe communication application instance 2 is not currently connected to a software data probe 4. Therefore, the probe communication application 2 offers limited functionality at this time. Commands that may be executed in this preconnection period include binding commands to buttons as depicted in FIG. 3 with respect to the command buttons 50. During the wait state following activation of the user interface 42, the probe communication application initialization routine 22 depicted in FIG. 2 sets up communications for a yet to be activated software data probe 4 by opening a socket and listening to the specified output port for an active probe as previously described.

The second command of FIG. 4, the 'rc_pools' command, is a batch file command which instructs the computer to inject a software data probe into an executable file on the next initialization of that executable file. In the case of the 'rc_pools' command, the 'pools' probe, contained within the pools.aws file, is readied to be injected into the sas.exe executable file when the sas.exe file is next run. As stated previously, the use of probes for debugging and testing is beneficial in that the probe may be temporarily injected into a program file 6 for testing without modification of the program code 6. This enables testing to be done easily and without worry that the testing code will have any lasting effect on the program functionality. In the example of FIG. 4, the 'pools' probe to be injected into the sas.exe file contains the probe interface module 8 for interface with the probe communication application. At this point in the example, communications between the software data probe 4 and the probe communication application 2 have still not been initiated. The software data probe code 4 is only readied to be inserted into the sas.exe file and is not yet activated.

FIG. 5 depicts the activation of an executable file, sas.exe, marked to have software data probe code inserted. In this portion of the example, the 'sdssas' command has been entered. The 'sdssas' file is a batch file which, among other things, initializes the sas.exe file. As noted in FIG. 4, the sas.exe file has been flagged to have the 'pools' probe inserted upon the next initialization of the sas.exe file. Upon activation of the sas.exe file and insertion of the 'pools' probe, the software data probe 4 becomes active. The probe interface module 8 contained within the software data probe 4 begins communications with the probe communication application 2 through the probe interface module's initialization routine 32. As previously described, the probe interface module's initialization routine 32 will communicate with the probe communication application via the already opened output port in order to alert the probe communication application 2 of the activation of the software data probe 4. In addition, the probe interface module initialization routine 32 will open a new socket and port for receipt of commands from the probe communication application 2.

Figure 6:
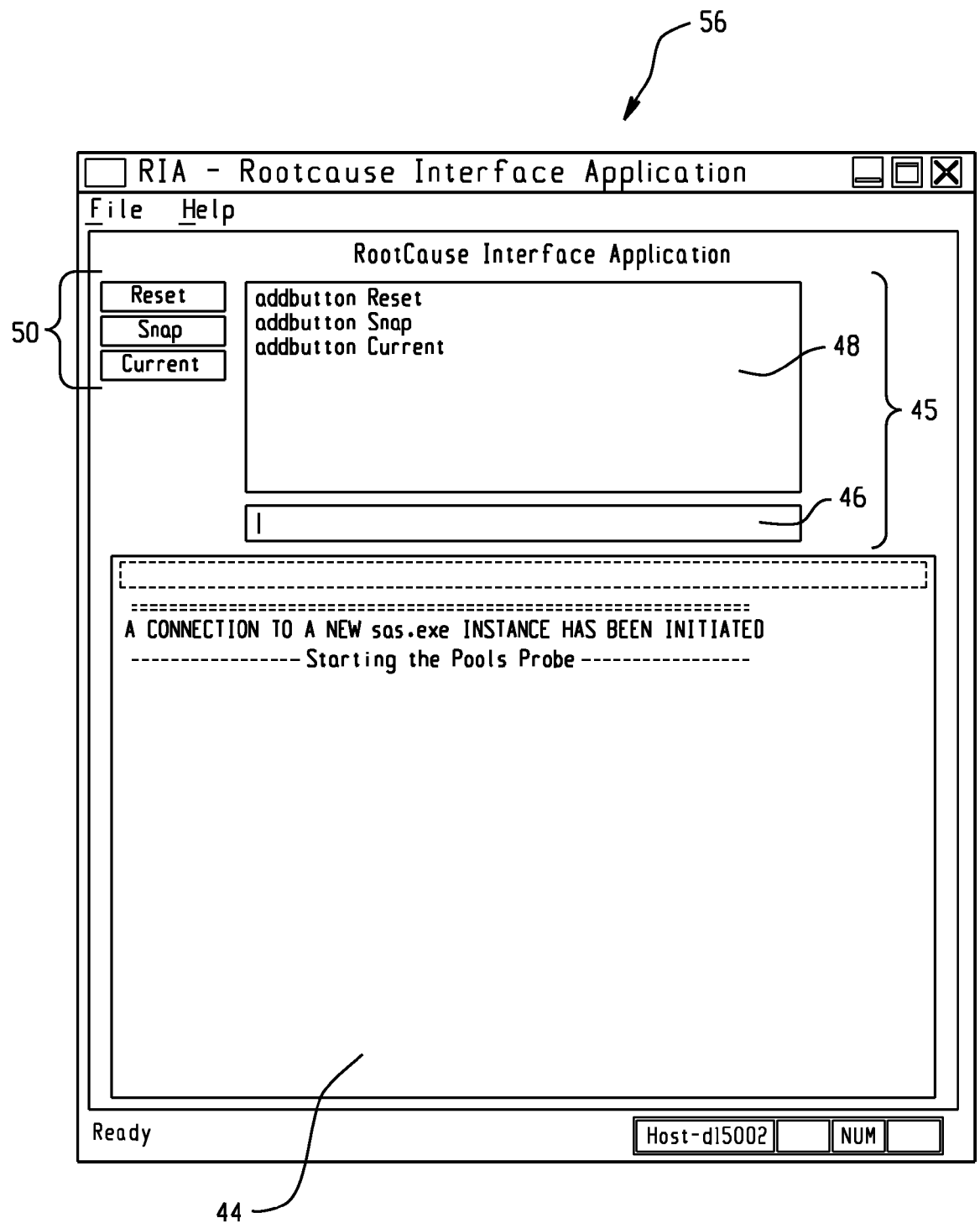
FIG. 6 depicts the probe communication application user interface following the initialization of communication with a software data probe.

FIG. 6 depicts the probe communication application 2 user interface 56 following the initialization of communication with a software data probe 4. Following initialization of communications with the software data probe 4, the log view 44 displays a message notifying the user of the successful connection. The log view 44 also notifies the user that the 'pools' probe has been started. In this example, the software data probe 4 has now entered a wait state and will become active upon receipt of a user command.

Figure 7:
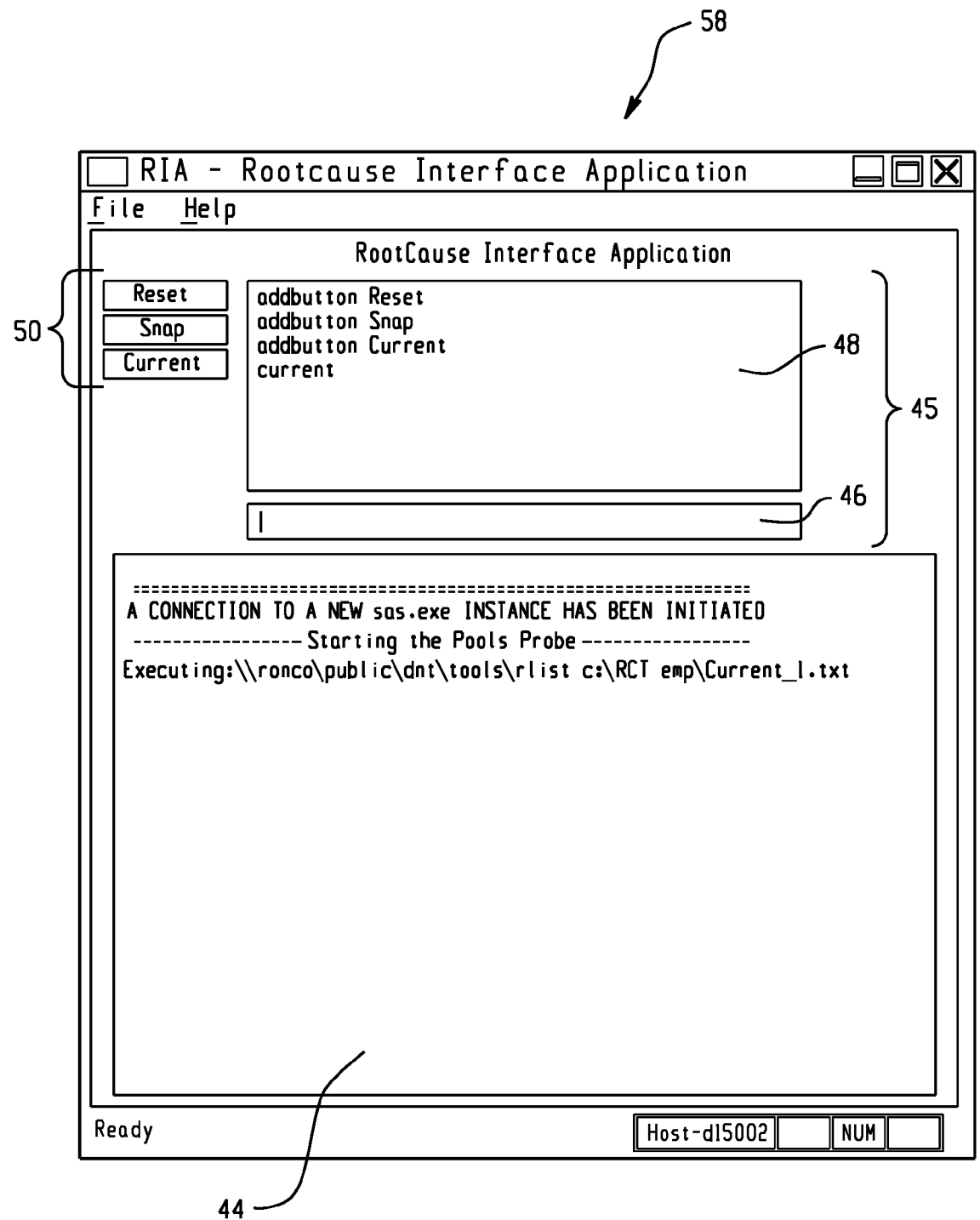
FIG. 7 depicts an example state of the probe communication application following a request to execute the 'current' command by a user.

FIG. 7 depicts an example state of the probe communication application 2 following a request to execute the 'current' command by a user. As noted earlier in discussion of the user interface, the 'current' command could be requested in a variety of ways including typing the word 'current' into the text entry box 46 or clicking on the previously created 'current' button 50. Upon entry of 'current' into the user interface according to the user interface instructions 24 depicted in FIG. 2, the command is received by the command receive module 26 and forwarded by the command forwarding module 28 to the process command routine 36 in the probe interface module 8. In this example, the instructions for executing the 'current' request from the user are contained within the 'Current_1.txt' file. The process command routine 36 recognizes the location of these instructions, begins executing the instructions, and commands the log write routine 34 of the probe interface module 8 to print a statement to the log view 44 of the probe communication application 2 notifying the user that the instructions contained within the 'Current_1.txt' file are being executed. In this example, the instructions within the 'Current_1.txt' file instruct the software data probe to capture the current memory state and to display the current memory state using the data view routine 40 previously discussed with reference to FIG. 2.

FIG. 8 depicts a data view 60 displaying a captured memory state during the execution of a program being tested. This view depicts the captured memory lake data and memory pool data such that a user may examine the data to try to diagnose any off-nominal program execution. The data view capabilities of the software data probe communication system 1 allows a user to command the software data probe to capture data in real-time and view the data during program 6 execution. This adds significant ease of use and efficiency gains over traditional debugging techniques where modifications may be made to the actual program code 6 in attempts to capture runtime program states.

Figure 9:
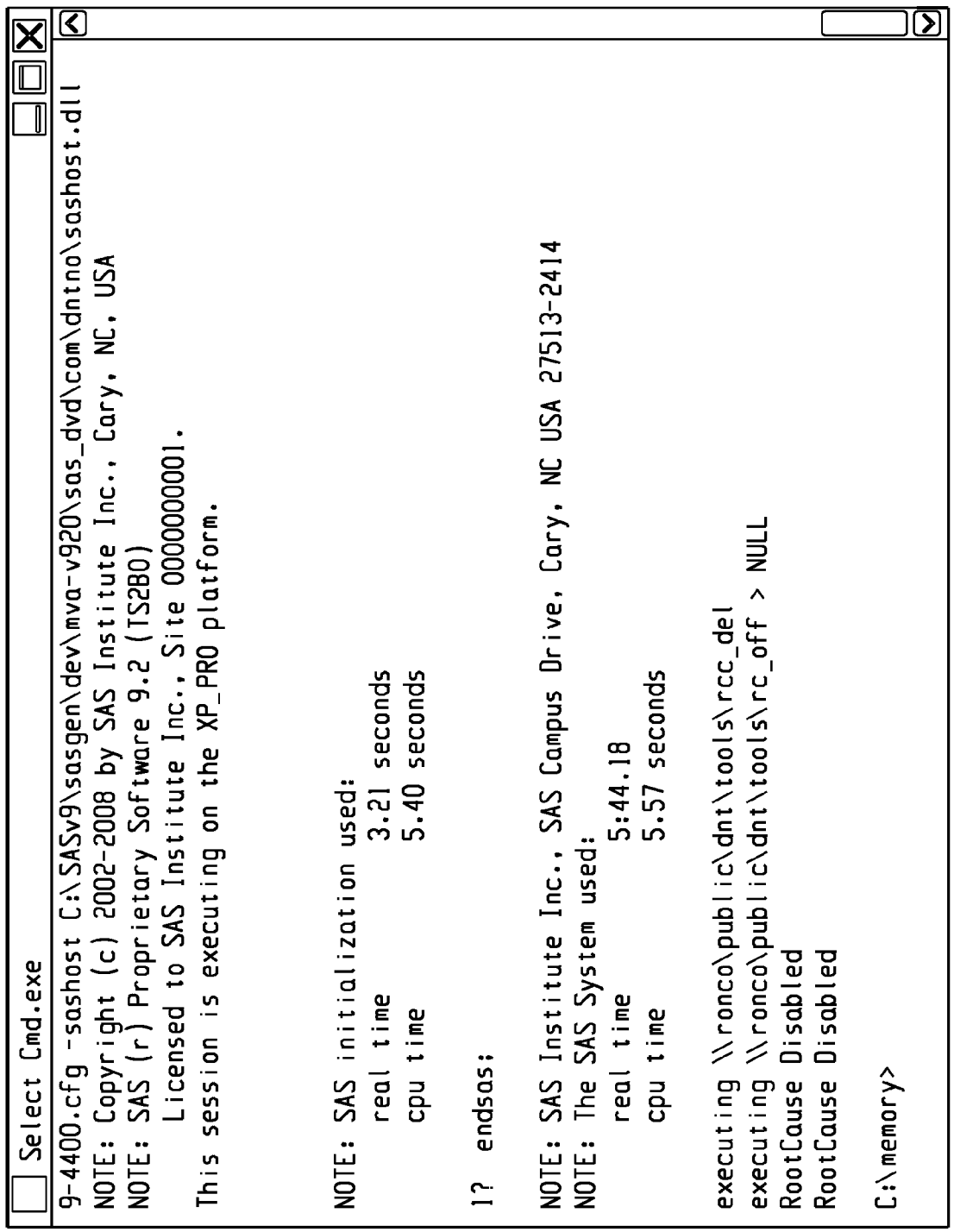
FIG. 9 depicts the shutdown of a program executable containing an inserted software data probe.

FIG. 9 depicts the shutdown of a program executable 6 containing an inserted software data probe 4. When the program 6 containing the software data probe 4 utilizing the probe interface module 8 is shutdown, the probe interface module's termination routine 38 activates, as previously discussed with reference to FIG. 2, and accomplishes the orderly shutdown of the software data probe's 4 communications with the probe communication application 2. As previously discussed, the termination routine 48 breaks the probe interface module's 8 connection to the probe communication application 2 and may instruct the proper relinquishment of memory portions being utilized by the software data probe 4 and probe interface module 8 such that the memory may be used by other applications.

Figure 10:
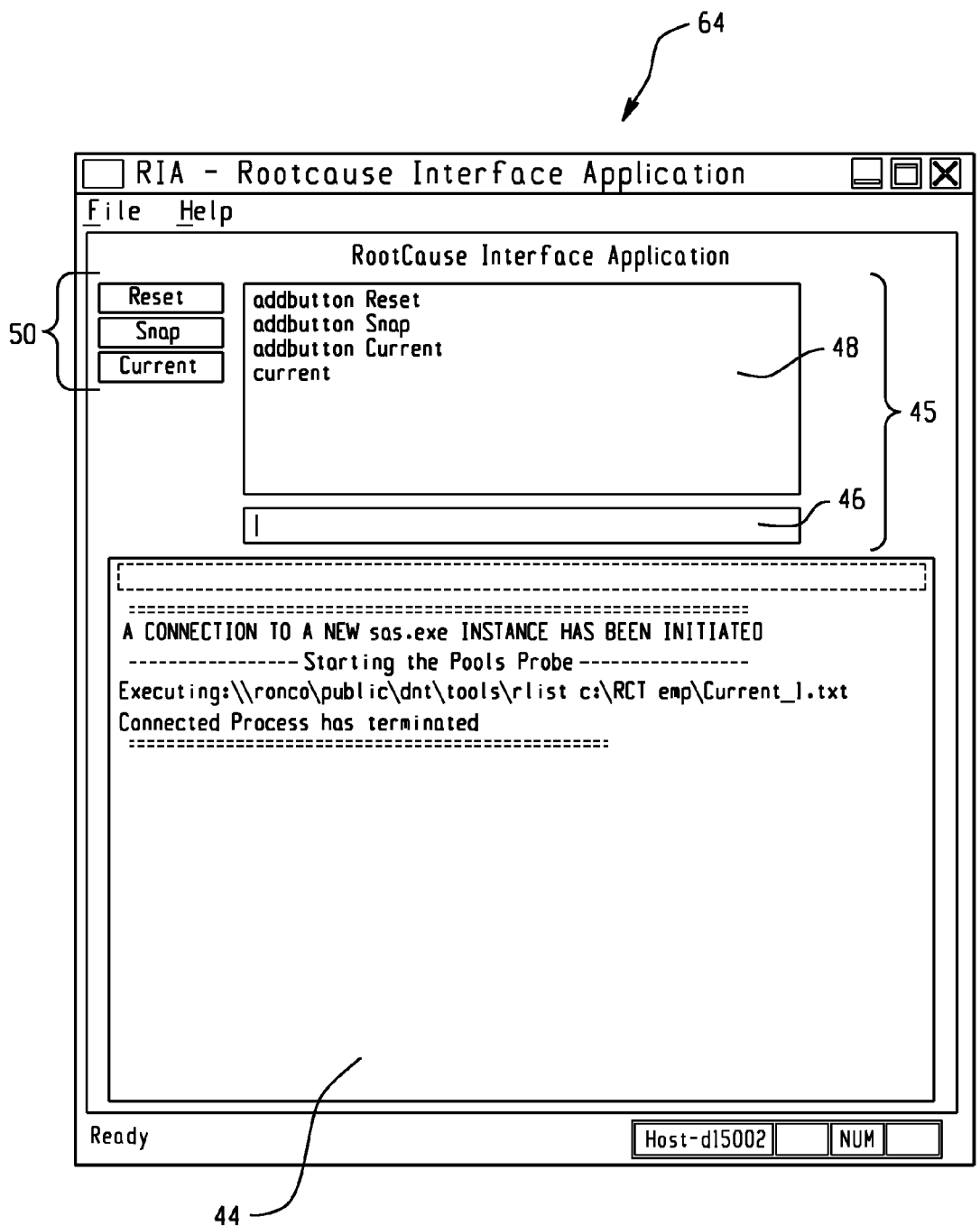
FIG. 10 depicts the probe communication application user interface following termination of communications with the software data probe.

FIG. 10 depicts the probe communication application 2 user interface 64 following termination of communications with the software data probe 4. Following termination of communications with the software data probe 4, the log view 44 displays a notification for the user that the connection to the software data probe 4 has been terminated. This will notify the user of an unexpected termination of communications or that a proper, orderly shutdown of the program 6 being tested has occurred.

Figure 11:
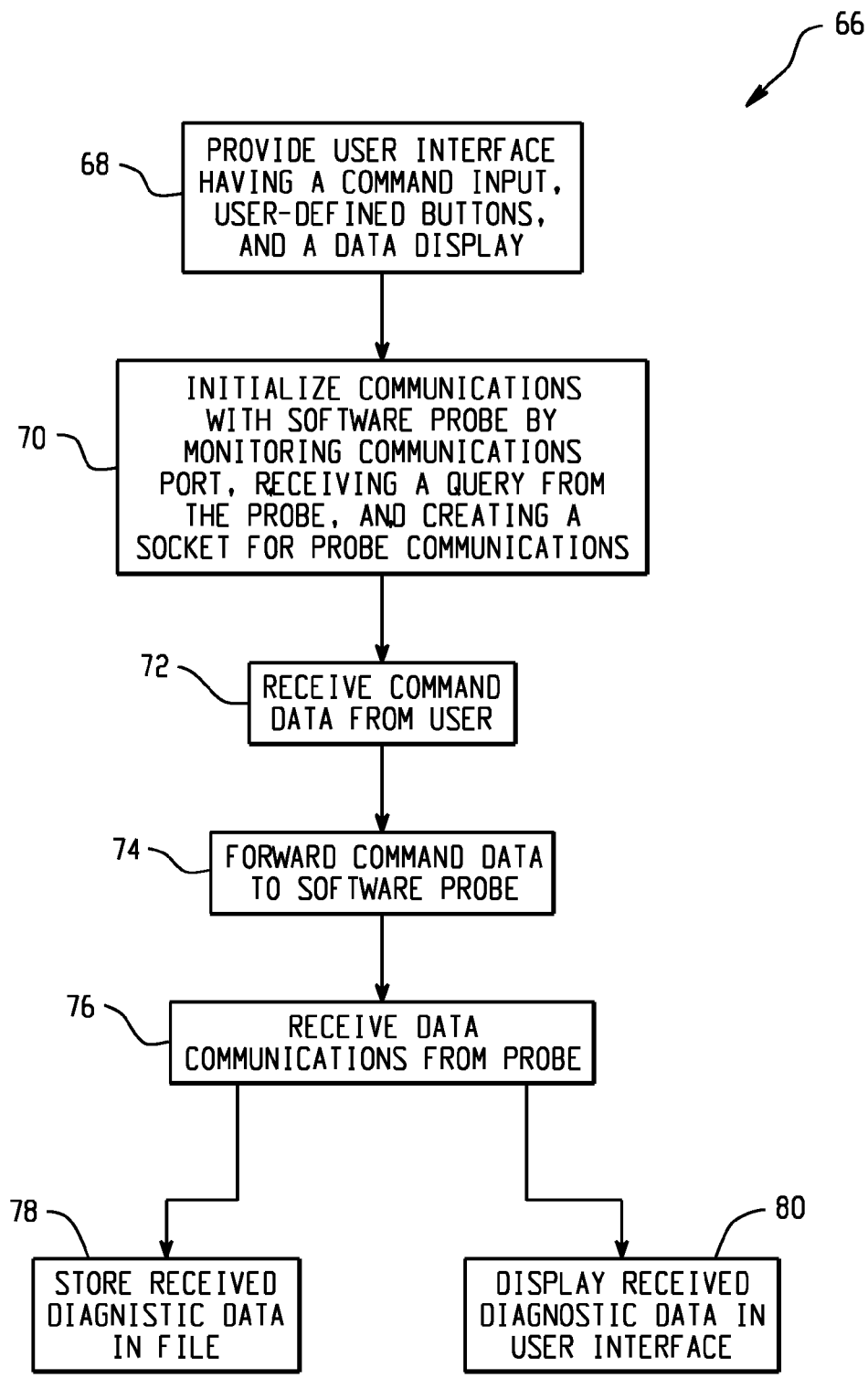
FIG. 11 depicts a flow diagram for initializing communications between a probe communication application and a software data probe and receiving user requested data from the probe.

FIG. 11 depicts a flow diagram for initializing communications between a probe communication application and a software data probe 4 and receiving user requested data from the probe. The process begins in step 68 with the activation of the probe communication application 2 which provides a user interface which may contain command inputs 46, user defined buttons 50, and a data display 44. In step 70, communications between the probe communication application 2 and the software data probe 4 are initialized. This may be accomplished via the probe communication application's initialization routine 22 initializing the output command port and listening for an active probe interface module 8. The probe communication application then receives a query from an active probe interface module 8, and the probe interface module 8 creates a socket for command receipt as previously discussed with reference to FIG. 2. In step 72, a user command is received via the user interface and processed by the command receive instructions 26. In step 74, the received commands are forwarded to the probe interface module 8 where they are received in step 76 and then executed. According to the command requested by the user, the diagnostic metric data 14 returned by the software data probe 4 in response to the user command may be stored in a data file 16 as depicted in step 78 or may be forwarded to the probe communication application 2 and displayed in the data display portion 44 of the probe communication application 2 as displayed in step 80.

Figure 12:
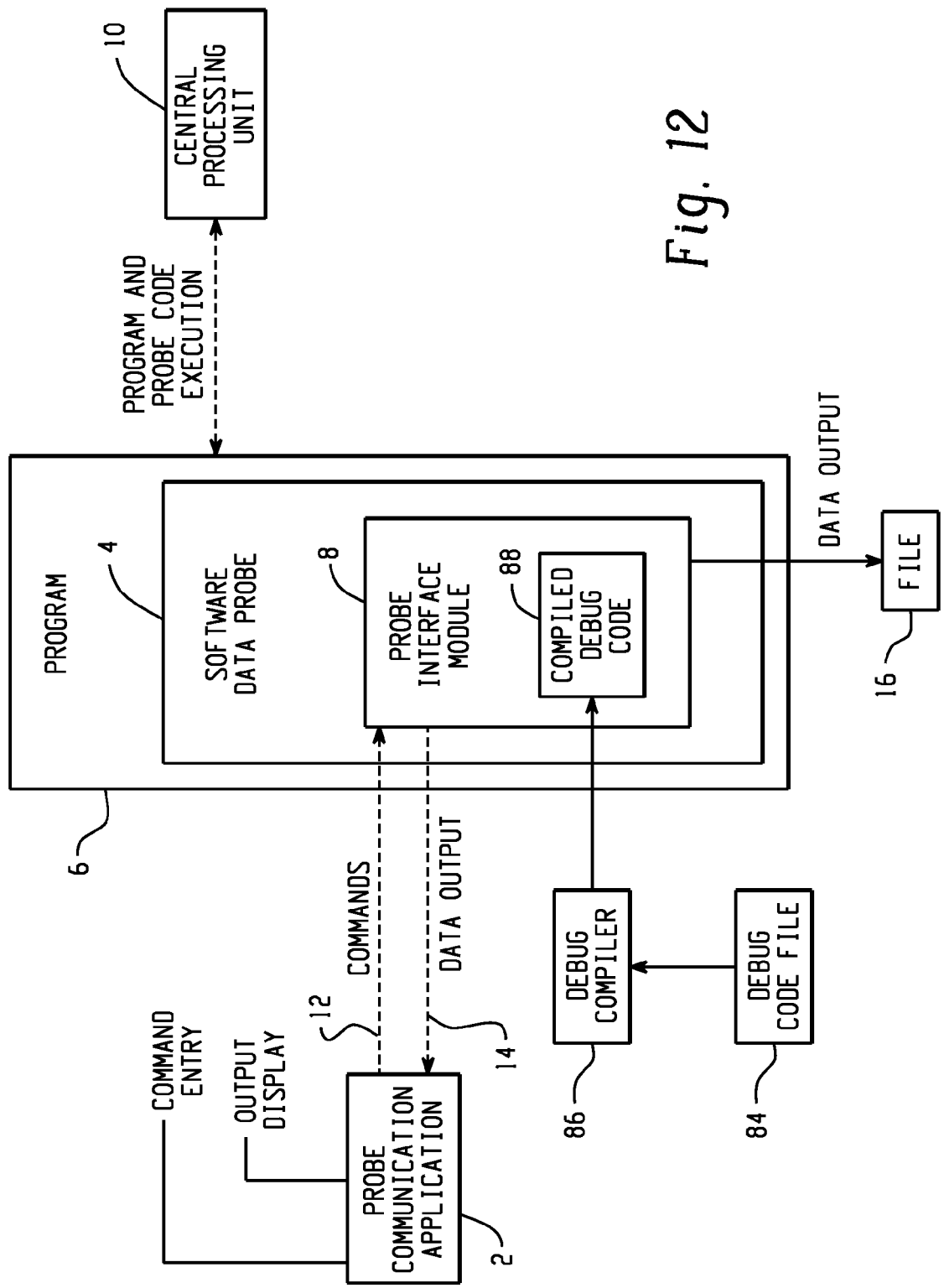
FIG. 12 is a block diagram depicting a software data probe communication system which includes the ability to inject debug code into program code for output metric data capture.

FIG. 12 is a block diagram depicting a software data probe communication system 82 which includes the ability to inject debug code into an instrumented software data probe 4 for output metric data 14 capture. The data probe communication system 82 includes a probe communication application 2 and a software data probe 4 contained within the code of a computer program 6. The computer program 6 resides in the main memory (not shown) of a computer such that the program 6, along with the software data probe 4 contained within the program 6, may be executed on a central processing unit (CPU) 10. The probe communication application 2 communicates with the software data probe 4 via a probe interface module 8 contained within the software data probe 4. The communication between the probe communication application 2 and the probe interface module 8 is bidirectional in nature such that commands 12 may be communicated from the probe communication application 2 to the probe interface module 8 for execution by the software data probe 4, and metric output data 14 may be communicated from the software data probe 4 through the probe interface module 8 to the probe communication application 2. In addition to communicating metric output data 14 to the probe communication application 2, the probe interface module 8 may also communicate metric output data 14 to a file 16 contained on a hard disk (not shown) for storage. The data probe communication system 82 of FIG. 12 also enables the insertion of compiled debug code 88 within an instrumented software data probe code 4. The compiled debug code is inserted into the software data probe 4 during runtime utilizing a debug compiler 86 which receives the instructions to be inserted via a debug code file 84.

Figure 13:
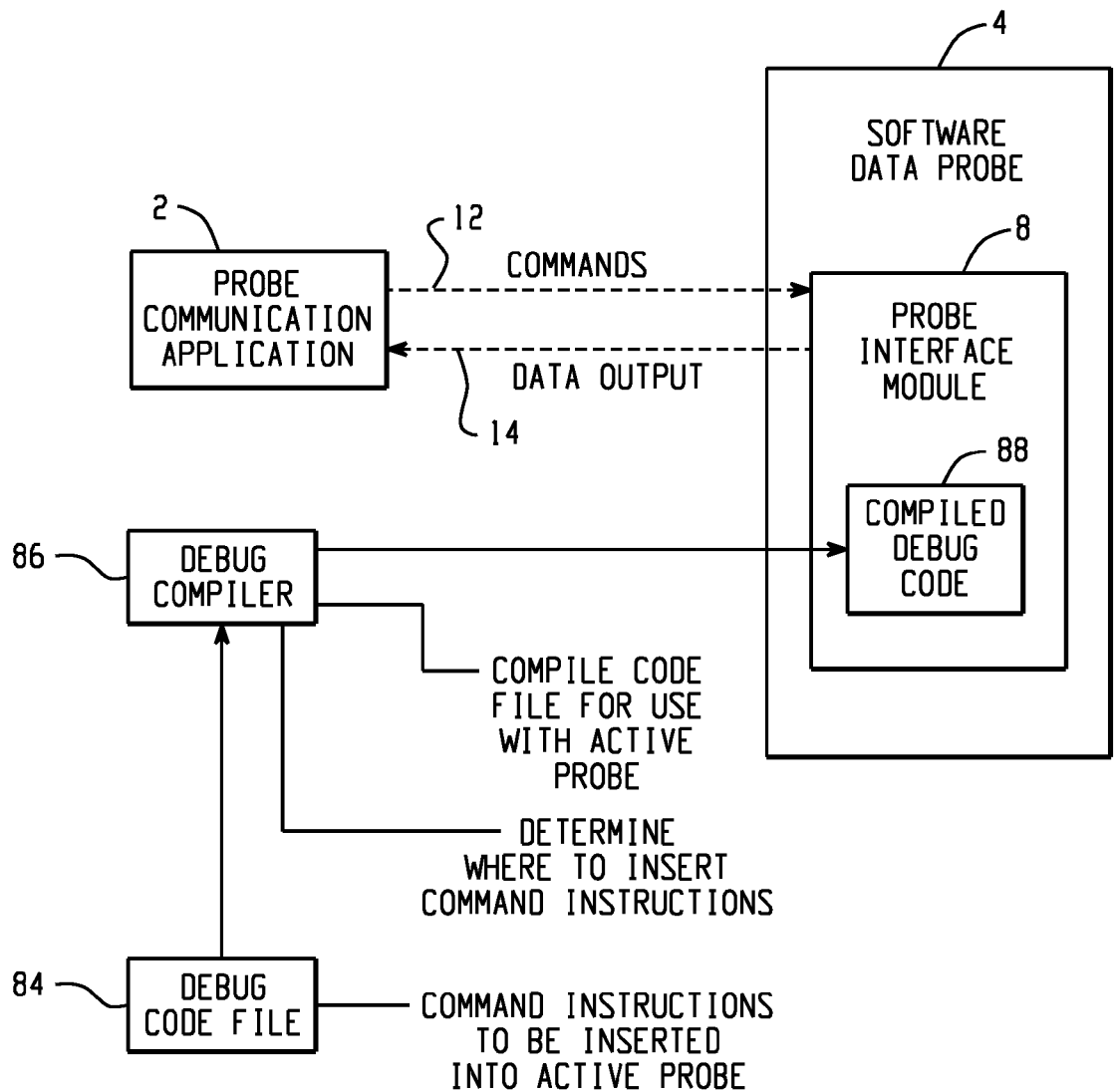
FIG. 13 is a detailed block diagram depicting the insertion of compiled debug code into an instrumented software data probe during runtime.

While many of the structures appearing in the data probe communication system 82 of FIG. 12 are similar to those appearing in the system 1 of FIG. 1, the system 82 of FIG. 12 further includes the ability to insert compiled debug code 88 into an instrumented software data probe 4 in a program 6 that is being tested. FIG. 13 is a detailed block diagram depicting the insertion of compiled debug code 88 into an instrumented software data probe 4 during runtime. The compiled debug code 88 originates as command instructions written in a debug code file 84. The debug code file 84 may be written by the testing engineer or another programmer, and the instructions written in the debug code file 84 may be written in a programming language such as Java™ or C++™ or may be written in a less formal form that may be interpreted by the debug compiler 86. The debug code file 84 is submitted to a debug compiler 86 for processing. The debug compiler 86 analyzes the debug code 64 file to determine the proper positions within the software probe code 4 for insertion of the debug code. The debug compiler 86 also compiles the debug code file 84 so that the code is in the proper syntax for execution within the software data probe 4 following insertion.

The ability to insert custom debug code into an instrumented software data probe 4 may be advantageous because of the advanced flexibility offered over a regular software data probe 4. This added flexibility allows a testing engineer to add code specific to the current testing to a running software data probe 4 that may act with precision that would be difficult utilizing a software data probe 4 alone.

Figure 14:
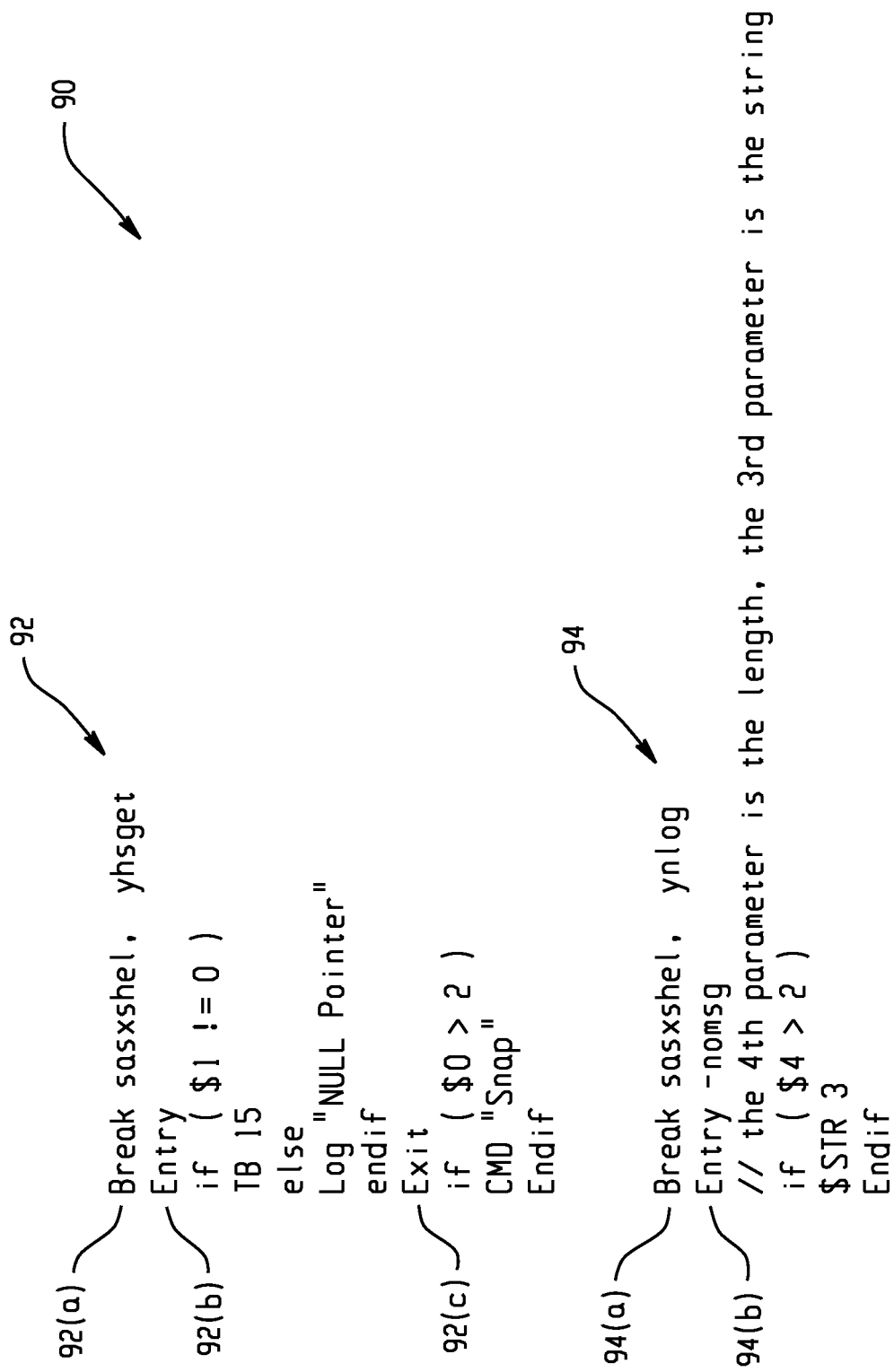
FIG. 14 is a sample code segment entered by a programmer into a debug code file for compiling and insertion into an instrumented software data probe.

FIG. 14 is a sample code segment 90 entered by a programmer into a debug code file 84 for compiling and insertion into an instrumented software data probe 4. It should be noted that the syntax of the code segment of FIG. 14 is used as an example, and other debug code file 84 syntaxes could be utilized. The code segment 90 of FIG. 14 is made up of two debug code segments 92, 94. Each code segment lists a set of instructions that are to be incorporated into a specified routine in a specified dll. Each code segment 92, 94 may be viewed as three portions. The first portion 92(a), 94(a) identifies the dll and routine on which the actions following should be taken. The second portion 92(b), 94(b) identifies the commands that should be done on entry into the specified routine. The third portion 92(c), 94(c)(not shown) identifies the commands that should be done on exit from the specified routine. No commands are requested upon exit from the second routine identified in portion 94(a). Therefore, there is no need to include the Exit portion which would have appeared as portion 94(c).

In the example of FIG. 14, the first code segment 92 of FIG. 14 begins with a break statement and references the 'sasxshel' dll and the 'yhsget' routine. The syntax for the first portion 92(a), 94(a) of a code segment is 'Break <[n]> dll, routine'. The 'Break' statement identifies the beginning of a codes segment. The [n] section of the first portion is an optional parameter. If specified, the code segment would only be operational on the [n]th call of the specified routine in the specified dll. Thus if [n] is specified as [6], the code segment would be executed on the $6^{th}$ call of the specified routine. If the [n] parameter is not specified, the code segment will be executed during each calling of the specified routine. The 'dll' parameter of the first portion identifies the dll where the desired routine resides, and the 'routine' parameter identifies the routine to be acted upon by name. Thus, the first portion 92(a) of the first code segment 92, instructs the software data probe to take the actions which follow on each call of the 'yhsget' routine in the 'sasxshel' dll.

The second code segment 92(b), 94(b) identifies actions to be taken upon entry into the routine identified in the first portion 92(a), 94(a) of the code segment. The second and third portions 92(b), 94(b) and 92(c), 94(c) may contain if/else/endif statements in order to offer additional functionality. Parameters within a routine are identified by a '$' followed by the number of the parameter in the routine. For example, in the second portion 92(b) of the first code segment 92 of FIG. 14, the second parameter of the 'yhsget' routine is identified as '$1.' In the second portion 92(b) of the first code segment 92, the software data probe 4 is instructed that upon entry to the 'yhsget' routine, if parameter 1 of the 'yhsget' routine is not equal to zero, then the probe should write 15 lines of the current traceback (TB) to the log viewer 44, else the phrase "NULL Pointer" should be written to the log viewer 44.

In the third portion 92(c) of the first code portion 92, the instructions to be carried out upon exit from the first instance of the 'yhsget' routine are detailed. In the 'Exit' portion 92(c) of the first segment 92, the software data probe 4 is instructed that if the return code ($0) of the 'yhsget' routine is greater than 2, then the 'Snap' command should be executed by the process command routine 36 of the probe interface module 8.

The second example of FIG. 14 identifies actions to be taken on each calling of the 'ynlog' routine in the 'sasxkern' dll as identified by the first portion 94(a). The second portion 94(b) identifies actions to be taken on entry into the 'ynlog' routine. The '-nomsg' parameter suppresses the message to the probe communication application's log viewer 44 stating that the routine identified in the compiled debug code 88 has been entered. The second portion 94(b) of the second code portion 94 states that if the fifth parameter ($4) is greater than 2, then the $4^{th}$ parameter ($3) should be printed to the log viewer. As stated previously, the third portion 94(c) of the second code segment 94 does not appear in FIG. 14 because no commands have been specified to be executed on exit of the 'ynlog' routine by the debug code file 84 programmer.

Figure 15:
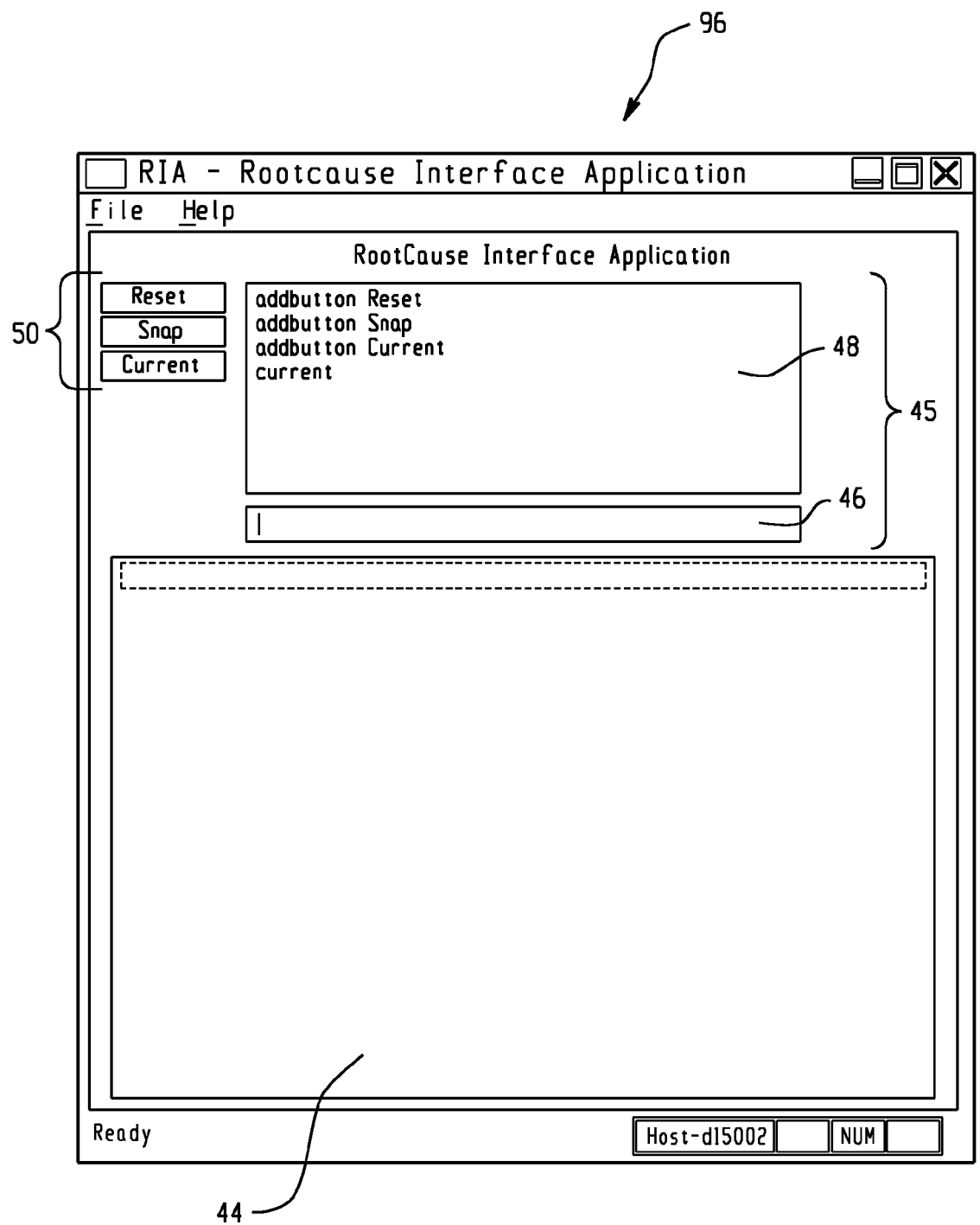
FIG. 15 depicts the probe communication application user interface presented to the user prior to activation of the program to be tested.

FIGS. 15-19 depict an example execution of a program 6 to be tested having a software data probe 4 and compiled debug code 88 inserted. In the examples of FIGS. 15-19, the probe communication application 2 has previously been initialized resulting in the presentation of the user interface appearing in FIG. 15 being presented to the user. The user interface depicted in FIG. 15 is similar in look and function to the user interface described with reference to FIG. 3.

Figure 16:
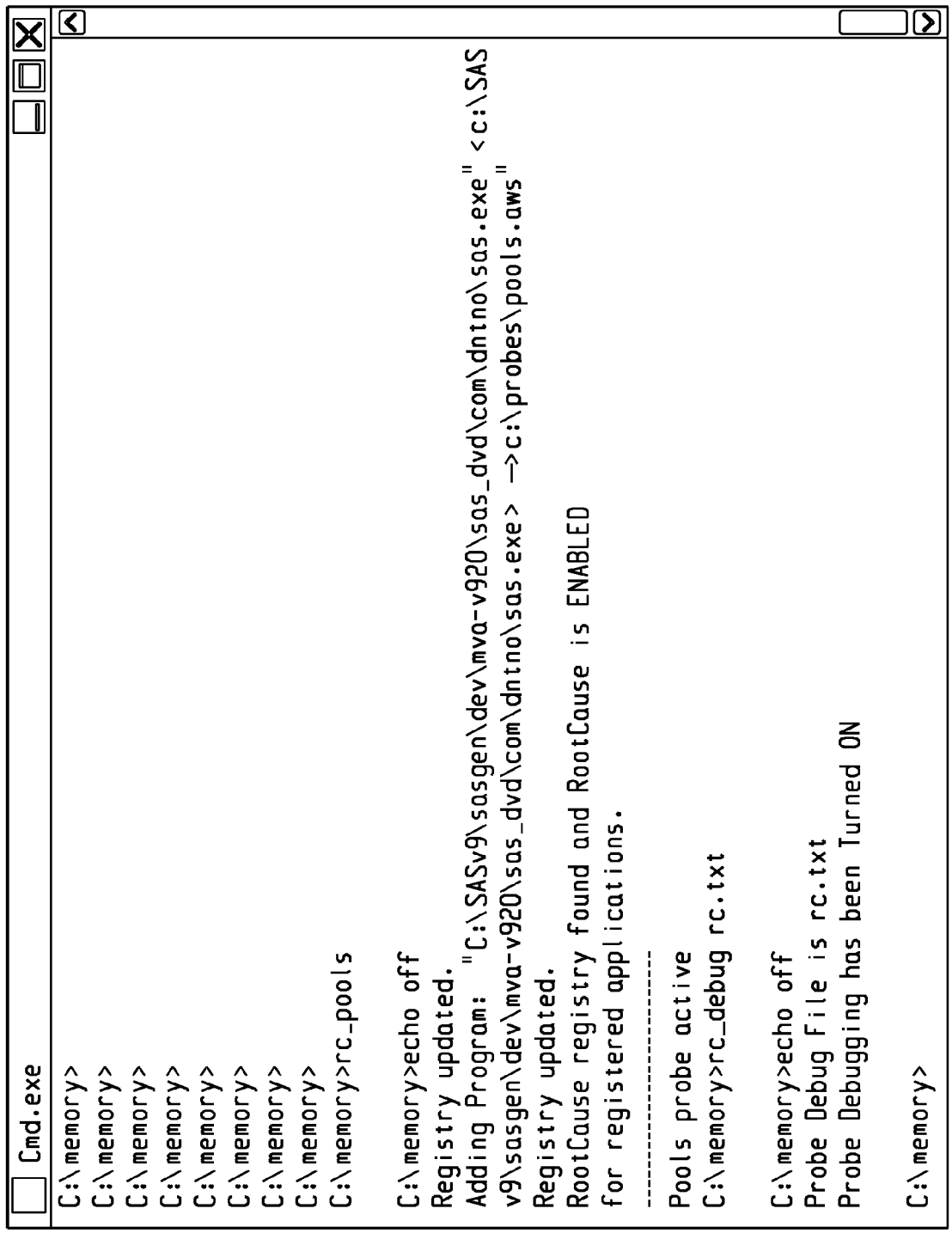
FIG. 16 depicts the initialization of a software data probe and compiled debug code.

FIG. 16 depicts the initialization of a software data probe 4 and compiled debug code 88. In FIG. 16, the 'rc_pools' command is entered which readies the 'pools' probe for insertion into the sas.exe executable when the sas.exe program is run. This is similar to the queuing of the 'pools' probe in the prior example shown in FIG. 4. Following the readying of the 'pools' probe in FIG. 16, the 'rc_debug' batch file is run having 'rc.txt' as a parameter. This command activates the debug compiler 86 and instructs the compiler to compile the instructions contained in the 'rc.txt' file in preparation for insertion into the 'pools' probe upon initialization of the sas.exe executable.

Figure 17:
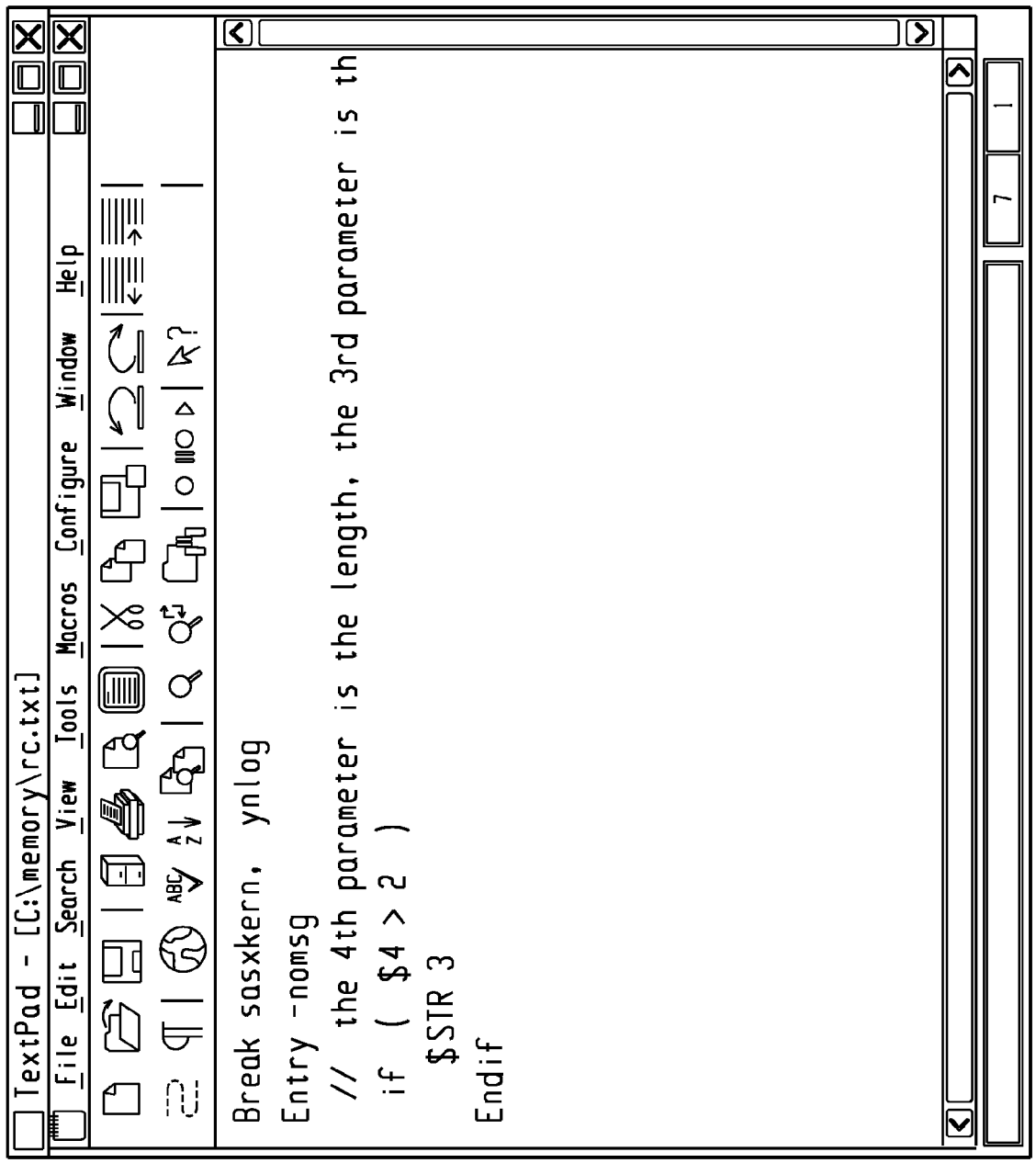
FIG. 17 depicts the contents of the 'rc.txt' file, the debug code file, compiled by the debug compiler.

FIG. 17 depicts the contents 100 of the 'rc.txt' file, the debug code file 84, compiled by the debug compiler 86 in the example of FIG. 16. This code portion directs the software data probe 4 to perform the following instructions on each execution of the 'ynlog' routine which is in the 'sasxkern' dll. Upon entry into the 'ynlog' routine, the '-nomsg' parameter suppresses the log viewer 44 message noting entry into the routine. Then, if the $5^{th}$ parameter ($4) is greater than 2, then the $4^{th}$ parameter is to be printed to the log viewer 44. In simpler terms, these commands instruct the software data probe 4 to break on the routine that writes data to the SAS log, and if the line to be written to the SAS log is greater than 2 characters, then the line should be written to the log viewer 44 as well. The 'rc.txt' code is compiled by the debug compiler 86 and inserted into the proper position in the software data probe 4.

FIG. 18 depicts the initialization of the sas.exe executable file via the execution of the 'sdssas' batch file. The launching of this executable file also initiates the injection of the 'pools' software data probe 4 into the sas.exe file according to the 'rc_pools' batch file previously executed. In addition, the code contained in the 'rc.txt' debug code file 84 compiled by the debug compiler 86 is then inserted into the instrumented software data probe 4.

Figure 19:
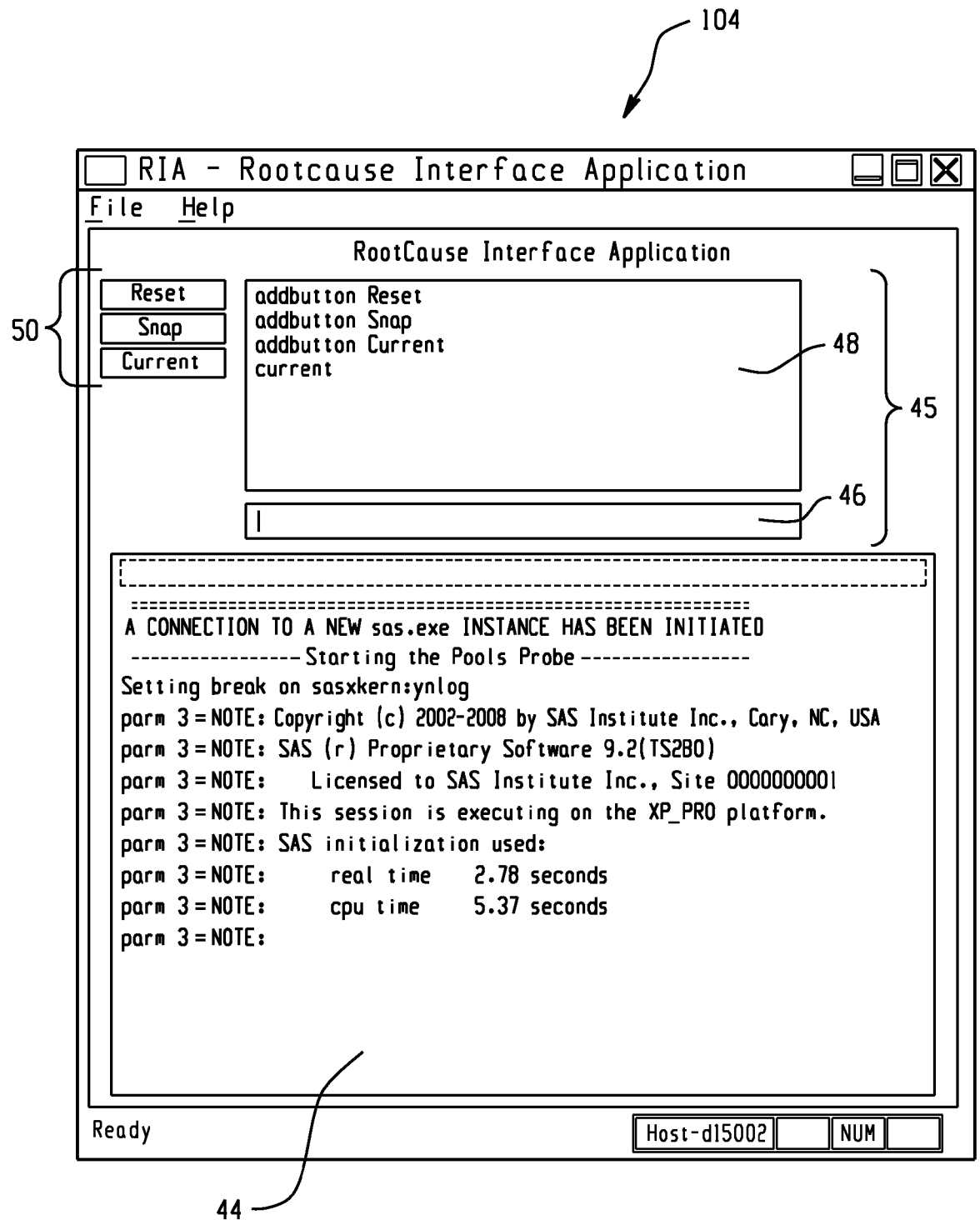
FIG. 19 depicts the probe communication application user interface following the initialization of the program executable.

FIG. 19 depicts the output to the probe communication application 2 user interface 104 following the initialization of the sas.exe executable. Following establishment of communications between the probe interface module 8 and the probe communication application 2, the log viewer 44 indicates the new connection to the software data probe 4 within the sas.exe file and the beginning of execution for the software data probe 4, 'pools.' The log viewer 44 then indicates that a breakpoint has been set at the 'ynlog'routine in the 'sasxkern' dll according to the instructions in the compiled debug code 88 that was injected into the software data probe 4 according to the direction of the debug compiler 86. The following lines in the log viewer 44 are the output of the inserted compiled debug code 88 which instructed that data written to the SAS log be also written to the log viewer 44. A comparison with the output to the log viewer 44 and the output shown in FIG. 18 following initialization of the sas.exe executable file shows proper execution of the desired code because the log viewer 44 shows all lines output to the SAS log depicted in FIG. 18 having more than two characters.

The example of FIGS. 15-19 illustrates two benefits of the ability to add debug code to an instrumented software data probe 4. First, the ability to write customized debug code allows the programmer a large increase in flexibility in customizing the software data probe. The programmer can select exactly which parameters he wishes to focus upon and can easily write different routines for different programs to be tested simply by editing text files. In addition, the customizable debug code adds a level of precision to the data capture by allowing the programmer to direct exactly when he wants to capture the desired data. More specifically, the ability to capture data on the [n]th running of the 'xxx' routine would be very difficult to replicate with a user utilizing the probe communication application 2 on its own as the timing of the [n]th running of the 'xxx' routine may be invisible to the user. This advantage allows the programmer to see results such as memory status after the program 6 has been running for a certain time. Those memory leaks would be difficult to observe by taking a memory state capture following termination of the program because at that point the memory pool may have been freed and the leak would not be visible.

Figure 20:
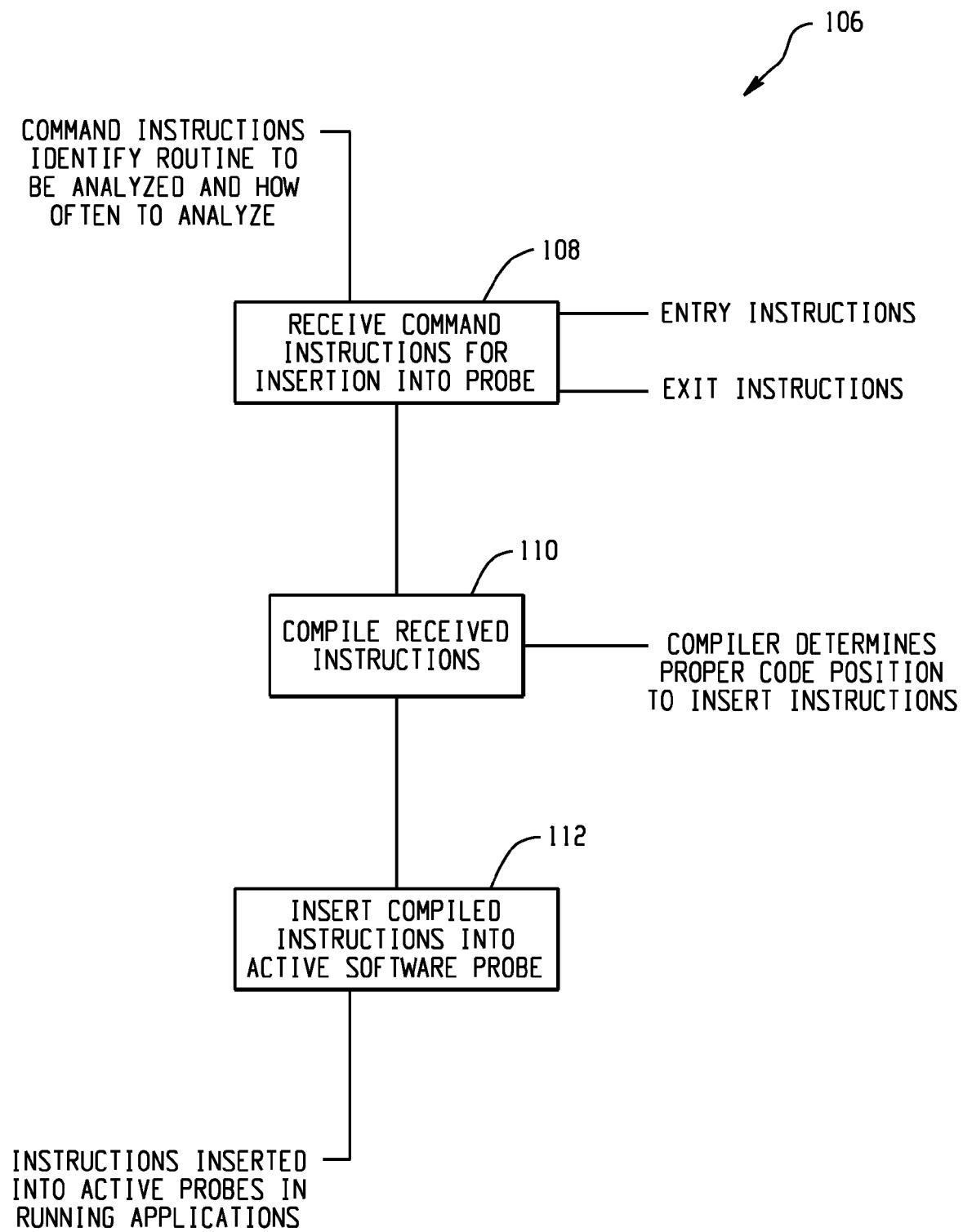
FIG. 20 is a flow diagram depicting the process of inserting custom debug code into an instrumented software data prob.

FIG. 20 is a flow diagram depicting the process 106 of inserting custom debug code into an instrumented software data probe 4. In step 108, the command instructions for insertion into a software data probe 4 are received. These command instructions may be stored in a debug code file 84. The command instructions may identify the program routine to be analyzed and the frequency of analyses. The command instructions may detail the actions that should be taken upon entry to and exit from the identified routine. In step 110, the received instructions are compiled. The compiling step 110 determines the position in the software probe where the received instructions should be placed for proper function. The compiling step may also accomplish a syntax translation of the received instructions so that the instructions are in proper form for insertion into the software data probe 4. Step 112 inserts the compiled instructions into an active software probe. The compiled instructions are inserted into the instrumented software probe at the position determined in the compiling step.

Figure 21:
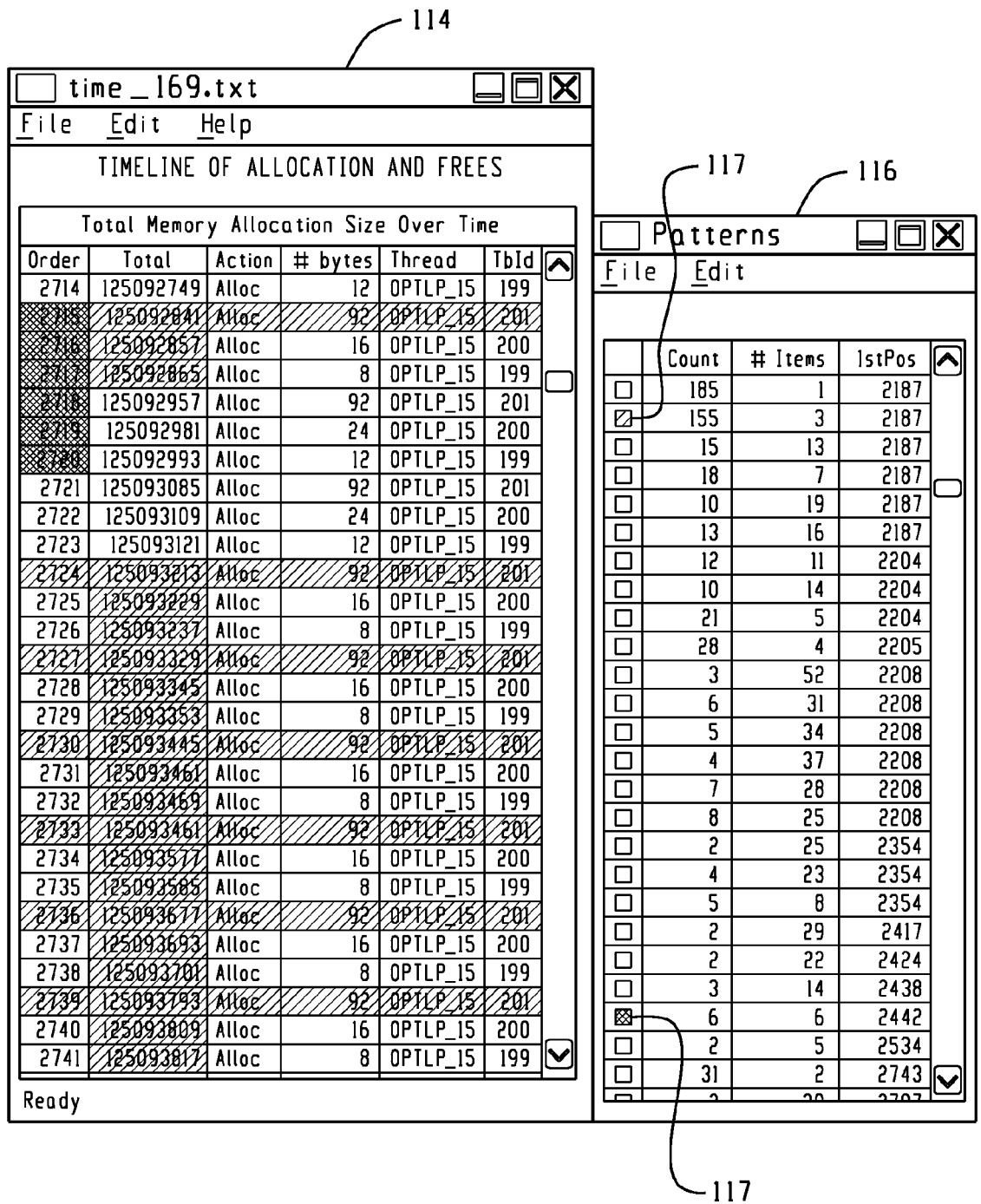
FIG. 21 depicts a table illustrating a system for visualizing patterns within a table of output metric data received from a software data probe.

FIG. 21 depicts a table 114 illustrating a system for visualizing patterns within a table of output metric data 14 received from a software data probe 4. The visualization may be offered in a companion data table window 114 to the probe communication application 2 user interface. A second list displaying a list of patterns recognized within the captured data displayed in the first data table window 114 may appear in a second companion pattern table window 116. The pattern table window 116 displays a list of all patterns detected within a set of captured data. A record for a detected pattern within the set of data may contain a count of how many times the pattern appears, the number of items that make up the pattern, and the position in the data table window 114 where the pattern first appears.

Selecting a pattern record in the pattern table window 116 identifies that pattern as a pattern that should be highlighted. The specific highlight 117 for a selected pattern may be identified in a column in the pattern table window 116. The highlight could be a color, a cell background pattern, a font change, etc. Once selected in the pattern table window 16, the records in the data table window 114 which make up the selected pattern may be highlighted. One method of highlighting a pattern in a data table window 114 is to highlight the entire row of a first record in the selected pattern and then highlighting a single column of the remaining records that make up the pattern as shown in the example of FIG. 21. Records that are members of more than one pattern set selected in the pattern table 16 may be identified in the pattern table window 114 by a unique conflict highlight indicating that the record in the data table window 114 is a member of more than one selected pattern. After a pattern record in the pattern table 116 has been selected by a user, for example by clicking on the record with a mouse, the record may be deselected by the user. Highlights in the data table window 114 corresponding to the deselected record would then be removed. Additionally, data table window 114 records which no longer correspond to multiple selected patterns following the deselection of a pattern would have the conflict highlight removed and would be highlighted according to the single pattern method described previously.

The pattern visualization system offers a software testing engineer a time-saving tool in discovering the functioning of a tested program. For example, in the example of FIG. 21, the data table window 114 contains a listing of memory allocations and frees for a thread over a period of time. Visually searching a plain data table containing all of the data records present in the data table window 114 for patterns which may indicate anomalous program function may be difficult. However, by highlighting patterns within the data, repetitions which may indicate non-optimal program function may be more easily discovered. For example, in FIG. 21, the highlighting of the pattern that appears 155 times and contains three items allows the testing engineer to see that allocations of 92, 16, and 8 bytes are made repeatedly. Because the allocation of memory has a time cost associated, the optimizations of these allocations would be beneficial. If the testing engineer is made aware of the repeated allocation of the same sized blocks of memory, then a streamlining may be attempted which would require the allocation to be made only once. The removal of these potentially unnecessary memory allocations could offer a significant boost to program function efficiency.

Figure 22:
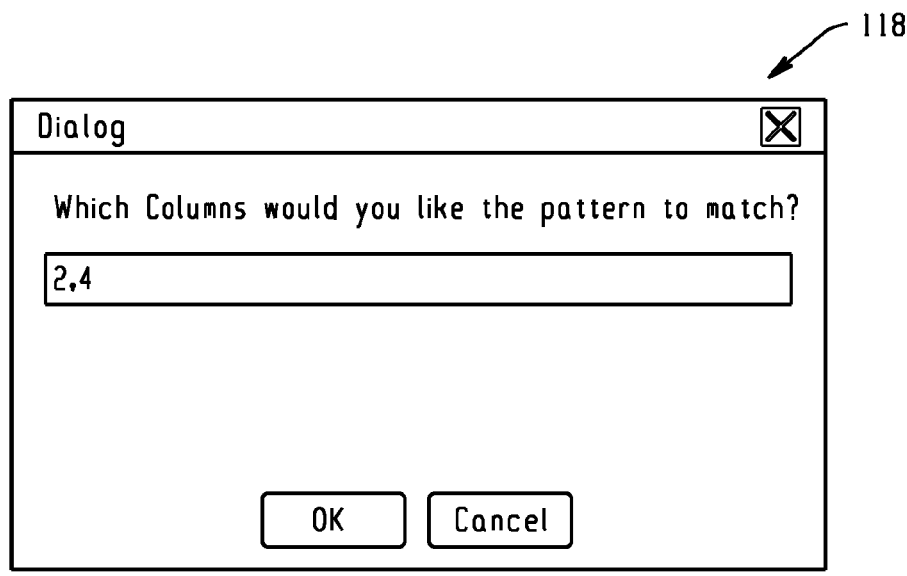
FIG. 22 depicts an input window for prompting a user to identify which columns should be searched for patterns.

A mechanism may be employed to recognize the patterns within the data table window 114 and display the recognized patterns within the pattern window 116. The pattern recognition mechanism may identify patterns according to one of the many pattern recognition algorithms available. The mechanism analyzes the data within the data table window 114 for patterns according to a user's preference. FIG. 22 depicts an input window 118 for prompting a user to identify which columns should be searched for patterns. After a user identifies which columns should be searched for patterns, the mechanism searches the data within the data table window 114 and displays the results in the pattern window 116 for selection.

Figure 23:
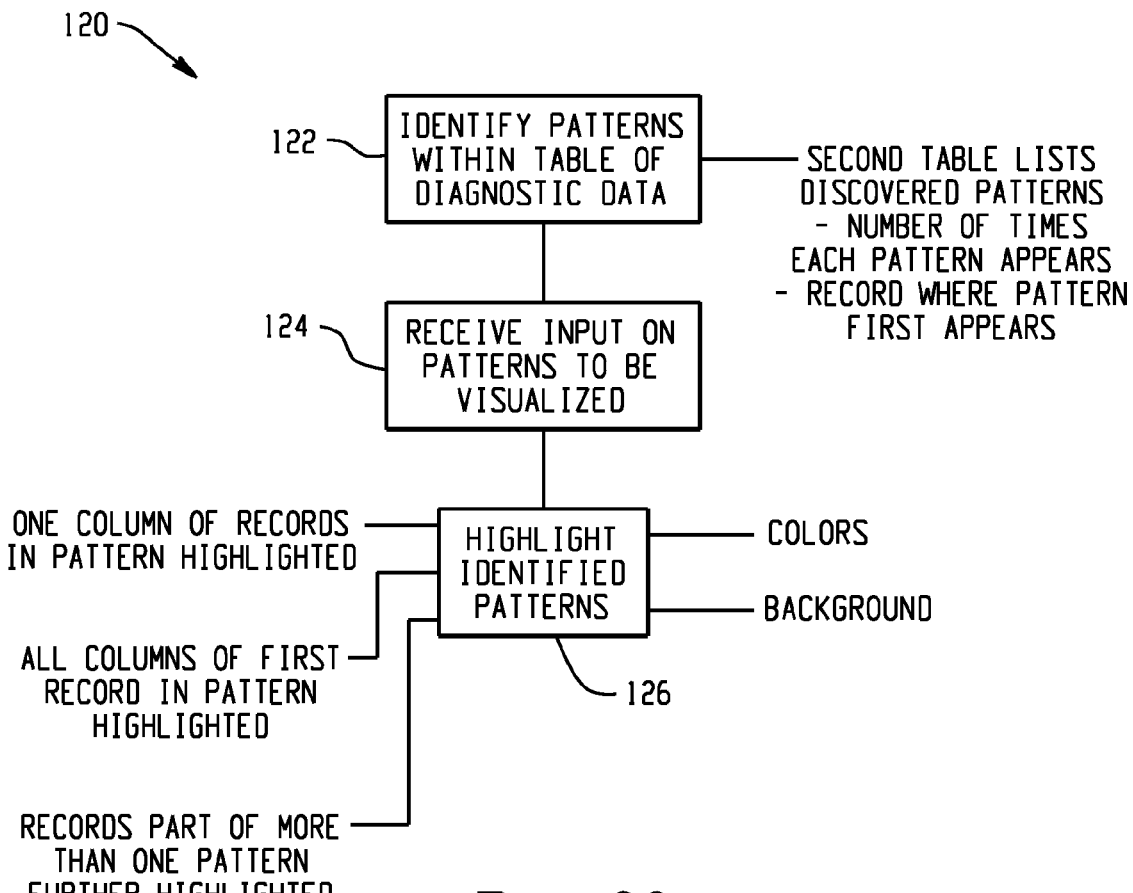
FIG. 23 depicts a flow diagram of a process for highlighting selected patterns within a table of data for ease in viewing.

FIG. 23 depicts a flow diagram of a process for highlighting selected patterns within a table of data for ease in viewing. In step 122, patterns within a table of diagnostic data are identified by a pattern recognition algorithm. The results of this identification step 122 may be listed in a second table which lists the discovered patterns, the number of times each pattern appears within the table of data, and the record number where the pattern first appears in the data table. In step 124, input is received as to which patterns should be visualized in the data table. One method of inputting this data may be selecting records in the second table listing the discovered patterns. After input is received describing which patterns should be visualized, the identified patterns are highlighted in the data table in step 126. Highlighting could be accomplished by changing the color of data table text, cell backgrounds, fonts, etc. In order to note the beginning of a pattern in the data table, the first record of a pattern may have all columns highlighted with subsequent records in the pattern having only one column highlighted. Data table records which are members of more than one selected pattern may be highlighted in a different matter such as a unique pattern conflict color so that a user will be informed that the specially highlighted data table record belongs to more than one selected pattern.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration. In addition, the systems and methods described herein may be implemented on various operating systems including Windows™ compatible, Linux™, and others.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for accessing real time data, comprising:
   providing a graphical interface for communicating with a software probe, wherein the software probe is an instrumented software probe that facilitates capturing output metric data, and wherein the graphical interface facilitates real-time bi-directional interaction with the software probe;
   inserting, using one or more data processors, the software probe into application code associated with an application, wherein the software probe monitors a performance of the application code without recompiling the application code;
   automatically initializing, using the one or more data processors, communication with the software probe during runtime of the application by:
      monitoring a communication port, wherein monitoring includes receiving a query on the communication port, and wherein the query is received from the software probe; and
      determining whether the query references a specified host, wherein determining includes ascertaining whether a host variable is specified by the query;
      creating a socket for communicating with the software probe, wherein creating a socket includes executing a probe initialization routine, wherein the probe initialization routine is operable to:
         connect, through a default output port, to a probe communication application on a local host, when the query does not reference a specified host; and
         connect to an output port to which a probe communication application is listening;
   receiving command instructions via the graphical interface, wherein the command instructions are executable by the software probe and are disposed to cause the software probe to collect data corresponding to application code associated with a running application;
   analyzing the command instructions, wherein analyzing includes determining an insertion position for inserting the command instructions within the software probe;
   compiling the command instructions to provide proper syntax for execution of the command instructions within the software probe;
   inserting the compiled command instructions into software probe code while the software probe code is within the application code, wherein inserting is performed during runtime of the application with which the application code is associated;

receiving, using the one or more data processors, collected data from the software probe; and providing the collected data for display on the graphical interface, wherein the graphical interface facilitates real-time interaction with the collected data.

2. The method of claim 1, wherein the software probe is configured to execute the command instructions.

3. The method of claim 1, wherein the command instructions include a software probe capture activation command and a software probe capture deactivation command.

4. The method of claim 1, further comprising:
receiving second command instructions entered via the graphical interface, wherein the second command instructions are based on the display of the collected data on the graphical interface.

5. The method of claim 1, further comprising:
storing the collected data in a file in a non-transitory computer-readable medium.

6. The method of claim 1, wherein the graphical interface includes a text box input for receiving the command instructions.

7. The method of claim 1, further comprising utilizing a software probe that is an AProbe™ compatible software probe or a DTrace™ compatible software probe.

8. The method of claim 1, wherein the software probe includes:
an initialization routine for negotiating communication with the graphical interface;
a log writing routine for writing a line of text to the graphical interface;
a process command routine for performing commanded actions; and
a termination routine for terminating communication with the graphical interface.

9. The method of claim 1, wherein the command instructions identify a routine in the application code to be analyzed.

10. The method of claim 9, wherein the command instructions identify a frequency with which the identified routine is to be analyzed.

11. The method of claim 9, wherein the command instructions identify actions to be taken upon initial execution of the identified routine.

12. The method of claim 9, wherein the command instructions identify actions to be taken upon completion of the identified routine.

13. A system for accessing real time data, comprising:
one or more processors;
one or more non-transitory computer-readable storage mediums containing instructions configured to cause the one or more processors to perform operations including:
providing a graphical interface for communicating with a software probe, wherein the software probe is an instrumented software probe that facilitates capturing output metric data, and wherein the graphical interface facilitates real-time bi-directional interaction with the software probe;
inserting the software probe into application code associated with an application, wherein the software probe monitors a performance of the application code without recompiling the application code;
automatically initializing communication with the software probe during runtime of the application by:
monitoring a communication port, wherein monitoring includes receiving a query on the communication port, and wherein the query is received from the software probe; and
determining whether the query references a specified host, wherein determining includes ascertaining whether a host variable is specified by the query;
creating a socket for communicating with the software probe, wherein creating a socket includes executing a probe initialization routine, wherein the probe initialization routine is operable to:
connect, through a default output port, to a probe communication application on a local host when the query does not reference a specified host; and
connect to an output port to which a probe communication application is listening;
receiving command instructions via the graphical interface, wherein the command instructions are executable by the software probe and are disposed to cause the software probe to collect data corresponding to application code associated with a running application;
analyzing the command instructions, wherein analyzing includes determining an insertion position for inserting the command instructions within the software probe;
compiling the command instructions to provide proper syntax for execution of the command instructions within the software probe;
inserting the compiled command instructions into software probe code while the software probe code is within the application code, wherein inserting is performed during runtime of the application with which the application code is associated;
receiving collected data from the software probe; and
providing the collected data for display on the graphical interface, wherein the graphical interface facilitates real-time interaction with the collected data.

14. A computer-program product for accessing real time data, the computer-program product tangibly embodied in a non-transitory machine-readable storage medium, the non-transitory storage medium including instructions configured to cause a data processing apparatus to:
provide a graphical interface for communicating with a software probe, wherein the software probe is an instrumented software probe that facilitates capturing output metric data, and wherein the graphical interface facilitates real-time bi-directional interaction with the software probe;
insert the software probe into application code associated with an application, wherein the software probe monitors a performance of the application code without recompiling the application code;
automatically initialize communication with the software probe during runtime of the application by:
monitoring a communication port, wherein monitoring includes receiving a query on the communication port, and wherein the query is received from the software probe; and
determining whether the query references a specified host, wherein determining includes ascertaining whether a host variable is specified by the query;
creating a socket for communicating with the software probe, wherein creating a socket includes executing a probe initialization routine, wherein the probe initialization routine is operable to:
connect, through a default output port, to a probe communication application on a local host, when the query does not reference a specified host; and connect to an output port to which a probe communication application is listening;

receive command instructions via the graphical interface, wherein the command instructions are executable by the software probe and are disposed to cause the software probe to collect data corresponding to application code associated with a running application;

analyze the command instructions, wherein analyzing includes determining an insertion position for inserting the command instructions within the software probe;

compile the command instructions to provide proper syntax for execution of the command instructions within the software probe;

insert the compiled command instructions into software probe code while the software probe code is within the application code, wherein inserting is performed during runtime of the application with which the application code is associated;

receive collected data from the software probe; and provide the collected data for display on the graphical interface, wherein the graphical interface facilitates real-time interaction with the collected data.

15. The computer-program product of claim 14, wherein the software probe is configured to execute the command instructions.

16. The computer-program product of claim 14, wherein the command instructions include a software probe capture activation command and a software probe capture deactivation command.

17. The computer-program product of claim 14, wherein the storage medium further including instructions configured to cause the data processing apparatus to:

receive second command instructions entered via the graphical interface, wherein the second command instructions are -based on the display of the collected data on the graphical interface.

18. The computer-program product of claim 14, wherein the storage medium further including instructions configured to cause the data processing apparatus to:

store the collected data in a file in a non-transitory computer-readable medium.

19. The computer-program product of claim 14, wherein the graphical interface includes a text box input for receiving the command instructions.

20. The computer-program product of claim 14, further comprising utilizing a software probe that is an AProbe™ compatible software probe or a DTrace™ compatible software probe.

21. The computer-program product of claim 14, wherein the software probe includes:

an initialization routine for negotiating communication with the graphical interface;

a log writing routine for writing a line of text to the graphical interface;

a process command routine for performing commanded actions; and a termination routine for terminating communication with the graphical interface.

22. The computer-program product of claim 14, wherein the command instructions identify a routine in the application code to be analyzed.

23. The computer-program product of claim 22, wherein the command instructions identify a frequency with which the identified routine is to be analyzed.

24. The computer-program product of claim 22, wherein the command instructions identify actions to be taken upon initial execution of the identified routine.

25. The computer-program product of claim 22, wherein the command instructions identify actions to be taken upon completion of the identified routine.

26. The system of claim 13, wherein the software probe is configured to execute the command instructions.

27. The system of claim 13, wherein the command instructions include a software probe capture activation command and a software probe capture deactivation command.

28. The system of claim 13, wherein the operations further include:

receiving second command instructions entered via the graphical interface, wherein the second command instructions are -based on the display of the collected data on the graphical interface.

29. The system of claim 13, wherein the operations further include: storing the collected data in a file in a non-transitory computer-readable medium.

30. The system of claim 13, wherein the graphical interface includes a text box input for receiving the command instructions.

31. The system of claim 13, further comprising utilizing a software probe that is an AProbe™ compatible software probe or a DTrace™ compatible software probe.

32. The system of claim 13, wherein the software probe includes:

an initialization routine for negotiating communication with the graphical interface;

a log writing routine for writing a line of text to the graphical interface;

a process command routine for performing commanded actions; and a termination routine for terminating communication with the graphical interface.

33. The system of claim 13, wherein the command instructions identify a routine in the application code to be analyzed.

34. The system of claim 33, wherein the command instructions identify a frequency with which the identified routine is to be analyzed.

35. The system of claim 33, wherein the command instructions identify actions to be taken upon initial execution of the identified routine.

36. The system of claim 33, wherein the command instructions identify actions to be taken upon completion of the identified routine.

\* \* \* \* \*